(12) United States Patent
Homan et al.

(10) Patent No.: US 11,157,966 B2
(45) Date of Patent: Oct. 26, 2021

(54) NETWORK OF SYSTEMS FOR GENERATING AND SENDING PERSONALIZED CAMPAIGN MESSAGES FROM A PLURALITY OF ENTITIES TO A PLURALITY OF CLIENTS AND A METHOD OF GENERATING AND SENDING SUCH MESSAGES

(71) Applicant: DeepTarget, Inc., Huntsville, AL (US)

(72) Inventors: Jill Homan, Madison, AL (US);
Ignacio Guerrero, Madison, AL (US);
Ravindra N. Kondekar, Mumbai (IN);
Ahmad Alavi, Madison, AL (US);
Preetha Pulusani, Madison, AL (US)

(73) Assignee: DeepTarget, Inc., Huntsville, AL (US)

( * ) Notice: Subject to any disclaimer, the term of this patent is extended or adjusted under 35 U.S.C. 154(b) by 0 days.

(21) Appl. No.: 17/139,152

(22) Filed: Dec. 31, 2020

(65) Prior Publication Data
US 2021/0209653 A1    Jul. 8, 2021

Related U.S. Application Data

(60) Provisional application No. 62/956,900, filed on Jan. 3, 2020.

(51) Int. Cl.
*G06Q 30/02* (2012.01)
*H04L 29/08* (2006.01)
(Continued)

(52) U.S. Cl.
CPC ......... *G06Q 30/0271* (2013.01); *G06F 3/017* (2013.01); *G06F 3/04815* (2013.01);
(Continued)

(58) Field of Classification Search
None
See application file for complete search history.

(56) References Cited

U.S. PATENT DOCUMENTS

2011/0187709 A1* 8/2011 Lee ................. G06T 15/00
345/419
2014/0279605 A1* 9/2014 Neilson ............ G06Q 30/018
705/317
(Continued)

OTHER PUBLICATIONS

International Search Report and Written Opinion dated Mar. 30, 2021, in international patent application No. PCT/US2020/067622, 7 pages.

*Primary Examiner* — Tuan S Nguyen
(74) *Attorney, Agent, or Firm* — Blueshift IP LLC; Robert Plotkin

(57) ABSTRACT

The present disclosure relates to a system generating and sending personalized campaign messages and a method thereof. The system comprises a system setup module, a client information server, a production server and a story delivery module. The system setup module initiate set up of the modules and repositories in said system using a first rules repository containing pre-set and pre-fed rules. The client information server receive and manage client data from said entity. The production server receives client data per se; or after filtration and create a multifaceted prism and fill it with personalised messages to create a 3d story for said client by using campaigns data and client data. The story delivery module deliver said 3d story to a client device.

42 Claims, 18 Drawing Sheets

(51) Int. Cl.
  *G06F 3/01*      (2006.01)
  *H04L 12/58*     (2006.01)
  *G06F 3/0481*    (2013.01)

(52) U.S. Cl.
  CPC ......... *G06Q 30/0276* (2013.01); *H04L 51/12*
    (2013.01); *H04L 51/16* (2013.01); *H04L 67/22*
    (2013.01); *H04L 67/26* (2013.01)

(56) References Cited

U.S. PATENT DOCUMENTS

| | | |
|---|---|---|
| 2015/0277755 A1 | 10/2015 | Hoffman |
| 2019/0004793 A1 | 1/2019 | Brebner |
| 2019/0025934 A1 | 1/2019 | Klappert |
| 2020/0007556 A1 | 1/2020 | Brebner |

* cited by examiner

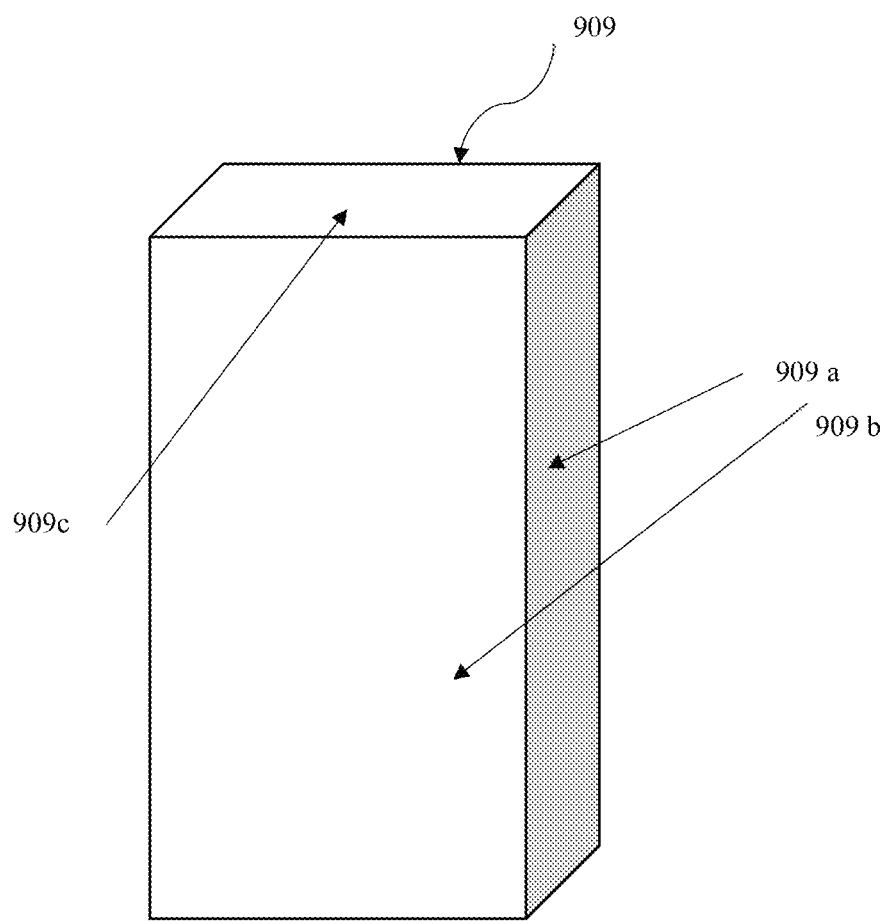
Figure 2.1

Figure 18

NETWORK OF SYSTEMS FOR GENERATING AND SENDING PERSONALIZED CAMPAIGN MESSAGES FROM A PLURALITY OF ENTITIES TO A PLURALITY OF CLIENTS AND A METHOD OF GENERATING AND SENDING SUCH MESSAGES

CROSS REFERENCE TO RELATED APPLICATIONS

This application claims priority to U.S. Provisional No. 62/956,900 filed on Mar. 1, 2020, the contents of which are hereby incorporated by reference in their entirety.

FIELD

The present disclosure relates to the field of generating and sending personalized campaign messages.

DEFINITIONS

As used in the present disclosure, the following terms are generally intended to have the meaning as set forth below, except to the extent that the context in which they are used indicate otherwise.

Entity—The term "Entity" hereinafter refers to any business, typically a bank, a financial institution, a building society, an insurance company or a lending corporation.

Client—The term "Client" hereinafter refers to a person or a group of people or a corporation or a company which are registered users of the entity.

Raw client data—The term "Raw client data" hereinafter refers to a data, shared by an entity which is to be processed and validated before use by a system of the present disclosure for generating and representing personalized content.

Pilot Message—The term "Pilot Message" hereinafter refers to a message that carries a distinct capability to run a campaign in a particular way by a system of the present disclosure for generating and representing personalized content.

Urgent pilot message—The term "Urgent Pilot Message" hereinafter refers to a pilot message that can override all the campaigns and make that campaign mandatory for all clients by a system of the present disclosure for generating and representing personalized content.

Non-discrete pilot message—The term "Non-discrete Pilot Message" hereinafter refers to a pilot message that makes a campaign mandatory for all clients along with other optional campaigns run by a system of the present disclosure for generating and representing personalized content.

Filter pilot message—The term "Filter Pilot Message" hereinafter refers to a pilot message that would subject the campaign to filtration by a system of the present disclosure for generating and representing personalized content.

Prism—The term "Prism" hereinafter refers to a multi-faceted and multidimensional geometric figure having regular or irregular faces that can be configured to be displayed onto a client device by a system of the present disclosure for generating and representing personalized content and which can be configured to be rotated while being displayed in order to reveal different messages on each face of the prism. The prism may have the capability of multiaxial rotation, including forward and backward rotation and up and down around various axes. Depending upon the gestures and strokes by the user, the speed and the direction of movement of the displayed prism on the user device can be controlled.

3d Story—The term "3d Story" hereinafter refers to a prism loaded with personalized messages relevant to a client shown on a client's device by a system of the present disclosure for generating and representing personalized content. In one embodiment 3d story is a smart 3d story.

Filtration—The term "Filtration" hereinafter refers to a technique of filtering client data using various techniques like filtering by rules, filtering by a list and predictive filtering by a system of the present disclosure for generating and representing personalized content.

Propensity—The term "Propensity" hereinafter refers to a habit, a persistent desire, curiosity or interest of a client towards a particular product, a campaign or a type of message offered in a campaign offered by an entity to its client and also the type of personalization liked by the client.

Predictive Model: The term "Predictive Model" hereinafter refers to a model that comprises a set of rules and instructions that can predict preferences of a client based on previous selection history and includes as a component, the client's propensity.

Relevance Weight: The term "Relevance Weight" hereinafter refers to a sorted calculated numerical value given to a campaign in relation to a client and vice versa.

Influenced conversion report: The term "Influenced conversion report" hereinafter refers to a report that is generated by the system which identifies the number of clients and the particular clients who have been influenced by a campaign or a campaign message and are converted i.e. have shown interest in the campaign or in the message.

Key engagement indicator: The term "Key engagement indicator" hereinafter refers to an average number of the clients logged on the system of the present disclosure for generating and representing personalized content to produce at least one click and it can also alert the entity if the average number is greater than a pre-determined threshold.

Category report: The term "Category report" hereinafter refers to a report on each of a campaign category using various chart.

Campaign freshness: The term "Campaign freshness" hereinafter refers to an age of campaign that signifies how old is an existing campaign.

BACKGROUND

The background information herein below relates to the present disclosure but is not necessarily prior art.

Today, the ability to attract customers/users to use a product is a major hurdle. Companies use different marketing strategies and give numerous offers and discounts just to retain existing users and attract more users, thereby growing their customer/user base and enhancing the business. Businesses/Companies in various industries display their offers and discounts on the company's website, on their product (or application) or simply send messages to their users using traditional direct mail (printed media) or electronic mail (email). These mass marketing strategies—instead of engaging the user have often served to turn them off. The user often ignores the ever-blinking and flashing messages they see on websites or applications; these offers and messages often consume the entire screen of the website or the application and leave users annoyed and irritated rather than motived to purchase a product. Further, the user may not even relate to the messages displayed, and tend to ignore reading all the messages because of this stratagem. Moreover, a lot of users stop using, visiting the websites or accessing their application because of the non-relevant nature of these mass messages. Users tend to perceive them to be repetitive, tedious and boring and therefore fail to respond to these messages and sometimes even delete or block them not necessarily because they are non-relevant but they are repetitive and based on their past experiences where they may be re-directed to another marketing website.

Therefore, there is a need in the market to provide a system for easily generating and sending personalized campaign messages for a large numbers of users, or defined users, which can alleviate the above mentioned drawbacks and motivate users to respond positively to the content that is displayed.

OBJECTS

Some of the objects of the present disclosure, which at least one embodiment herein satisfies, are as follows:

It is an object of the present disclosure to ameliorate one or more problems of the prior art or to at least provide a useful alternative.

An object of the present disclosure is to provide a system for generating and sending personalized campaign messages.

Another object of the present disclosure is to provide a system that dynamically delivers personalized campaign messages to potentially significant numbers of clients.

Yet another object of the present disclosure is to provide a system that utilizes customer/business intelligence to create relevant messages for each client.

Still another object of the present disclosure is to provide a system that allow each client to move through multi-faceted content so that multiple campaign messages and offers can be presented at one time.

Another object of the present disclosure is to provide a system that reacts and responds to multiple personalized campaign messages or offers ("content").

Yet another object of the present disclosure is to provide a system that is interactive with respect to the client reacting and responding to the content provided.

Still another object of the present disclosure is to provide a system that is easy to deploy, highly performant and cost-effective.

Other objects and advantages of the present disclosure will be more apparent from the following description, which is not intended to limit the scope of the present disclosure.

SUMMARY

The present disclosure envisages a system for generating and sending personalized campaign messages.

According to a first aspect of the disclosure, there is provided a network of systems for generating and sending personalized campaign messages from a plurality of entities to a plurality of clients, wherein each of the client is a client of at least one of the entities and each system in the network is associated with one entity in a one to one correspondence, wherein each of the client has a client device in which is configured an application associated with at least one entity of the plurality of entities, to which the client belongs, a system, associated with the entity in the network implemented in at least one computer, comprises a system setup module, a client information server and a production server.

In accordance with a second aspect of the disclosure there is provided, A network of systems for generating and sending personalized campaign messages from a plurality of entities to a plurality of clients, wherein each of the client is a client of at least one of the entities and each system in the network is associated with one entity in a one to one correspondence, wherein each of the client has a client device in which is configured an application associated with at least one entity of the plurality of entities, to which the client belongs, a system associated with the entity in the network implemented in at least one computer, comprises a system setup module, a client information server, a targeting module, a production server and a story delivery module.

In accordance with both aspects of the disclosure, the system setup module is configured to initiate set up of the modules and repositories in the system, the system setup module having a first rules repository containing pre-set and pre-fed rules.

In accordance with both aspects of the disclosure, the client information server is configured to receive client data from the entity and further configured to manage the client data, the client information server further comprises a data receiving module, a data monitoring module, a data converter module, a first data repository and a data loading module.

In accordance with both aspects of the disclosure, the data receiving module is configured to receive incoming raw client data from a client data sending module resident in the entity.

In accordance with both aspects of the disclosure, the data monitoring module is configured to cooperate with the data receiving module to receive raw client data and monitor its complete receival.

In accordance with both aspects of the disclosure, the data converter module is configured to receive the monitored raw client data, and is further configured to convert the monitored raw client data into validated and formatted data, based on the pre-fed and pre-set rules from the first rules repository.

In accordance with both aspects of the disclosure, the first data repository comprises non-transitory computer medium and is configured to store the validated and formatted data.

In accordance with both aspects of the disclosure, the data loading module is configured to receive the validated and formatted data from the data converter module and is further configured to push the validated and formatted data into the first data repository.

In accordance with both aspects of the disclosure, the production server is configured to receive the validated and formatted client data per se in accordance with the first aspect of the disclosure; or the validated and formatted client data after filtration in accordance with the second aspect of the disclosure, the production server comprises a campaigns receiving module and a multifaceted prism building block.

In accordance with both aspects of the disclosure, the campaigns receiving module is configured to receive a plurality of campaigns wherein each campaign consists of at least one message from a campaigns sending module resident in the entity.

In accordance with both aspects of the disclosure, the multifaceted prism building block is configured to: receive a signal, from the client device of a client who is a client of the entity when the client has logged on to an application pre-fed by the entity and which is pre-set on the client device; fetch the validated and formatted data of the client from the first data repository; select at least one campaign from the campaigns receiving module after reading and determining campaign[s] relevant to the client; create a stack of messages of the selected campaigns; personalize each message in the stack using the fetched validated and formatted data of the client to create personalized stacks of messages; and create a 3d story on a multifaced prism using the personalized stack of messages.

In accordance with both aspects of the disclosure, the system includes a story delivery module is configured to receive the created 3d story and is further configured to deliver the 3d story to the client device.

In accordance with both aspects of the disclosure, the multifaceted prism building block comprises a production module, a personalization module and a multifaceted prism assembly module.

In accordance with both aspects of the disclosure, the production module is configured to fetch validated and formatted data of a client and select at least one unique campaign from the campaigns receiving module relevant to the client and is further configured to create and save a unique message stack for the client in a production repository comprising a non-transitory computer storage medium.

In an embodiment, the campaign receiving module is configured to cooperate with the campaigns sending module to receive the campaign designed by the entity.

In an embodiment, the production module includes a campaign fetching module, a message extractor module, a decision module and a stack creation module.

In accordance with both aspects of the disclosure, the campaign fetching module is configured to fetch at least one campaign from the campaigns receiving module.

In accordance with both aspects of the disclosure, the message extractor module is configured to extract a pilot message and a campaign message from the received campaign, the pilot message being a message selected from a group of pilot messages consisting of: (i) an urgent message that overrides all the campaigns and make that campaign mandatory for all clients; (ii) a non-discrete message that is to be disseminated for all clients along with other optional campaigns; and (iii) a filter message that would subject the received campaign to filtration.

In accordance with both aspects of the disclosure, the decision module is configured to compare the campaign message with validated and formatted data of client based on the pilot message to find out a relevant message for the client and is further configured to iterate this process for each campaign in the campaigns receiving module.

In accordance with both aspects of the disclosure, the stack creation module is configured to receive the relevant message and is further configured to create a unique message stack to save at least one relevant message for the client in a production repository.

In accordance with both aspects of the disclosure, the personalization module is configured to personalize the message in the message stack upon requirement based on the validated and formatted client data and create a personalized message stack.

In an embodiment, the personalization module inserts the client's first name dynamically at least at one appropriate place in the message dynamically, in order to personalize the at least one message in the message stack if the message is required to be personalized.

In accordance with both aspects of the disclosure, the multifaceted prism assembly module is configured to create at least one multifaceted prism and load the personalized messages on the faces of the multifaceted prism using the personalized message stack to create a 3d story.

In an embodiment, the multifaceted prism assembly module includes an ad building module, a loading module and a populating module.

In accordance with both aspects of the disclosure, the ad building module is configured to create a prism, and is further configured to determine and create the number of faces of a multifaceted prism and determine width and height of the messages to be inserted on the faces.

In accordance with both aspects of the disclosure, the loading module is configured to load at least one preconfigured image on at least one end face of the multifaceted prism.

In accordance with both aspects of the disclosure, the populating module is configured to pull a message from the personalized unique message stack from the personalization module and is further configured to dynamically load the message on to a lateral face of the multifaceted prism and create a 3d story and is configured to iterate this dynamic message loading process upon sensing client's swipe gesture while hovering over the 3d story onto a fixed number of lateral faces of the multifaceted prism.

In an embodiment, the multifaceted prism assembly module further includes a redirection module which is configured to identify a stroking/swiping gesture of the client when the client hovers over the 3d story and is further configured to redirect the client to a pre-set URL or to a preconfigured image based on the gesture.

In an embodiment, the system further comprises a statistics managing module which is configured to receive clicks and impressions from the client device related to the 3d story and is further configured to save the received clicks and impressions in a second repository which is in the form of a non-transitory computer storage medium.

In accordance with both aspects of the disclosure, the statistics managing module includes a receiver, the second repository and a stats delivery module.

In accordance with both aspects of the disclosure, the receiver in the story delivery module is configured to receive clicks and impressions related to the 3d story from the client device.

In accordance with both aspects of the disclosure, the second repository, which is in the form of a non-transitory computer storage medium, is configured to store the impressions and clicks data corresponding to the clients and the campaigns.

In accordance with both aspects of the disclosure, the stats delivery module is configured to cooperate with the receiver of the story delivery module to receive the clicks and impressions and is further configured to push the impressions and clicks data to the second repository.

In an embodiment, the system further includes a performance statistics module which is configured to process the plurality of impressions and clicks stored in the second repository of the client and is further configured to generate a plurality of performance reports in relation to a campaign and is still further configured to transmit the reports to the entity.

In accordance with one embodiment of the disclosure, the performance statistics module includes the second repository and a statistics generation module.

Typically, the second repository is configured to cooperate with the stats delivery module to receive the impressions and clicks data of the client and is further configured to store the impressions and clicks data.

In accordance with one embodiment of the disclosure, the statistics generation module is configured to send a performance report of a campaign to the entity.

In an embodiment, the system further includes a template repository which is in form of a non-transitory computer storage medium, is configured to store images, fonts, campaign templates and is configured to be accessible by designs for the entity for designing campaign.

In accordance with the second aspect of the disclosure, the targeting module is configured to filter and extract validated and formatted data present in the first data repository for the entity includes a rules processor, a list processor and a predictive machine learning model processor.

In this embodiment, the rules processor comprises a third repository which is in form of a non-transitory computer storage medium, is configured to store and save a plurality of pre-set targeting rules for linking of campaigns to clients and further includes a crawler and extractor pair which is configured to crawl upon the first data repository and extract client ids based on the rules from the first data repository corresponding to the campaigns based on the pre-set targeting rules.

In an embodiment, the rules processor is configured to execute targeting rules based on multiple combinations of operators from 'AND', 'OR', 'NOT', 'greater than', 'equal to', 'not equal to', 'less than', 'not less than' and the like.

In an embodiment, the rules processor is configured to use the targeting rules to extract the client ids from the first data repository that qualify for at least one of the rules.

In accordance with the second aspect of the disclosure, the list processor is configured to receive a list of extracted client ids and is further configured to extract validated and formatted client data, of clients with whom selected campaigns are to be shared.

In one embodiment of the disclosure, the predictive machine learning model processor is configured to shortlist clients based on a predictive model.

Typically, the predictive machine learning model processor includes a model creation module and a model execution.

Typically, the model creation module is configured to cooperate with the second repository to create a predictive model for each of the campaigns and is further configured to determine the propensity of a client.

Typically, the model execution module is configured to cooperate with the first data repository to fetch the client data to calculate a relevance weight for each of the campaigns and is further configured to select a plurality of campaigns for the client using the relevance weight.

In both aspects of the disclosure, the statistics generation module is configured to generate and send at least one report to the entity, that report includes: an influenced conversion report which is configured to chart a plurality of new accounts opened by the new clients that have been influenced by a view of the campaign and therefore click on at least one of the personalized messages of the campaign; a campaign category analytics report is configured to share the campaign performance across all the campaigns or within a selected category of the campaign; a monthly management report is configured to encapsulate the client engagement performance results directly related to the campaigns published within past five calendar months; a key engagement indicator is configured to display an average number of the clients logged on to produce at least one click and is further configured to provide an alert if the average number is greater than a pre-determined threshold; a category report is configured to display all the campaigns in each of the categories via a donut chart; and a views report is configured to display the most viewed campaigns, typically in the past 7 days.

In an embodiment, the statistics generation module is further configured to send a performance metrics to provide an overall view of a status of the data and the campaigns, the performance metrics include: data freshness configured to display the number of days since the last day the data was uploaded; and campaign freshness configured to display an average age of the campaign.

In an embodiment, the statistics generation module is further configured to send an ad stats today in real-time, that includes: total number of impressions today as well as the highest number of impressions seen in the last 30 days; today clicks—shows number of clicks today; and campaign alert—shows a campaign more than 90 days old or is trending down.

In an embodiment, the statistics generation module is configured to generate reports where data can be seen on an entity's device in an application and can be exported to one of .csv, .xls and .png file.

In an embodiment, the statistics generation module the campaign performance information can be displayed in one of a bar graph, a donut chart, historical view or a tabular view.

In an embodiment, the system may be implemented using at least one processor.

The present disclosure also envisages aspects relating to a method for generating and sending personalized campaign messages which are disclosed herein below.

In an embodiment of the method the personalized campaign messages are delivered to the client device in realtime.

BRIEF DESCRIPTION OF THE ACCOMPANYING DRAWING

A system for generating and sending personalized campaign messages and a method thereof, of the present disclosure will now be described with the help of the accompanying drawing, in which.

Figure 1:
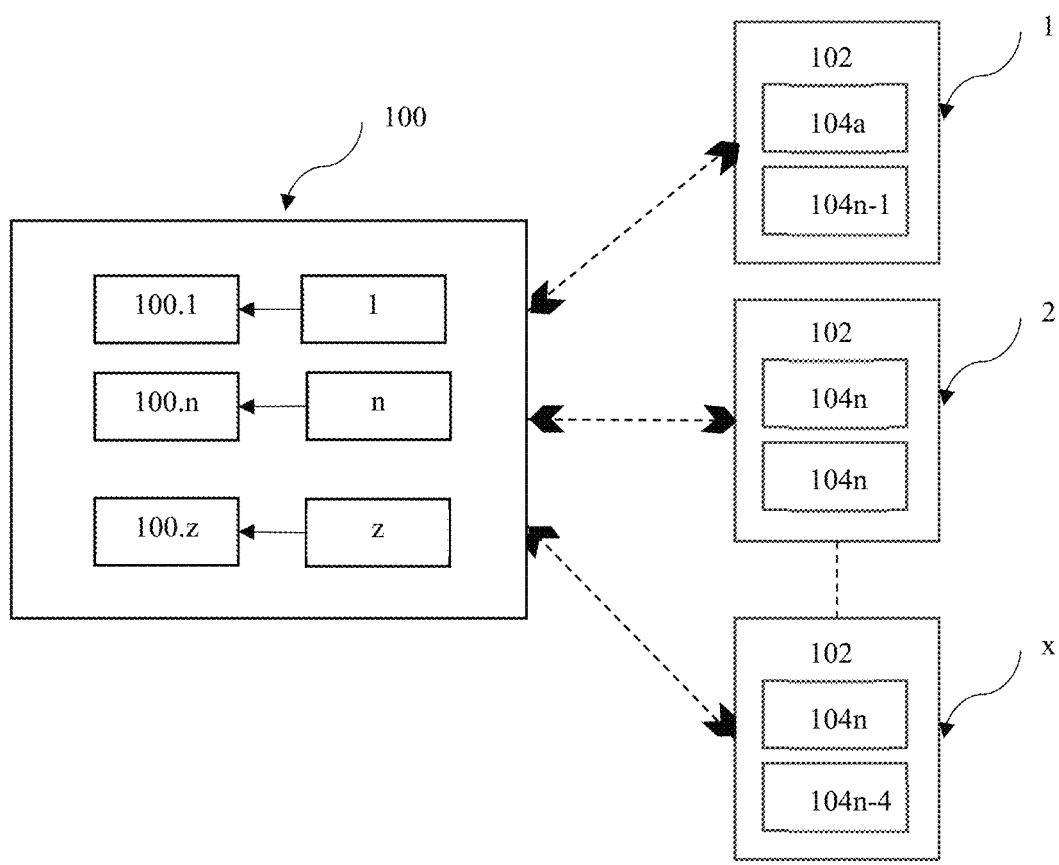
FIG. 1 illustrates a block diagram of a network (100) of systems for generating and sending personalized campaign messages, in accordance with an embodiment of the present disclosure.
Figure 2:
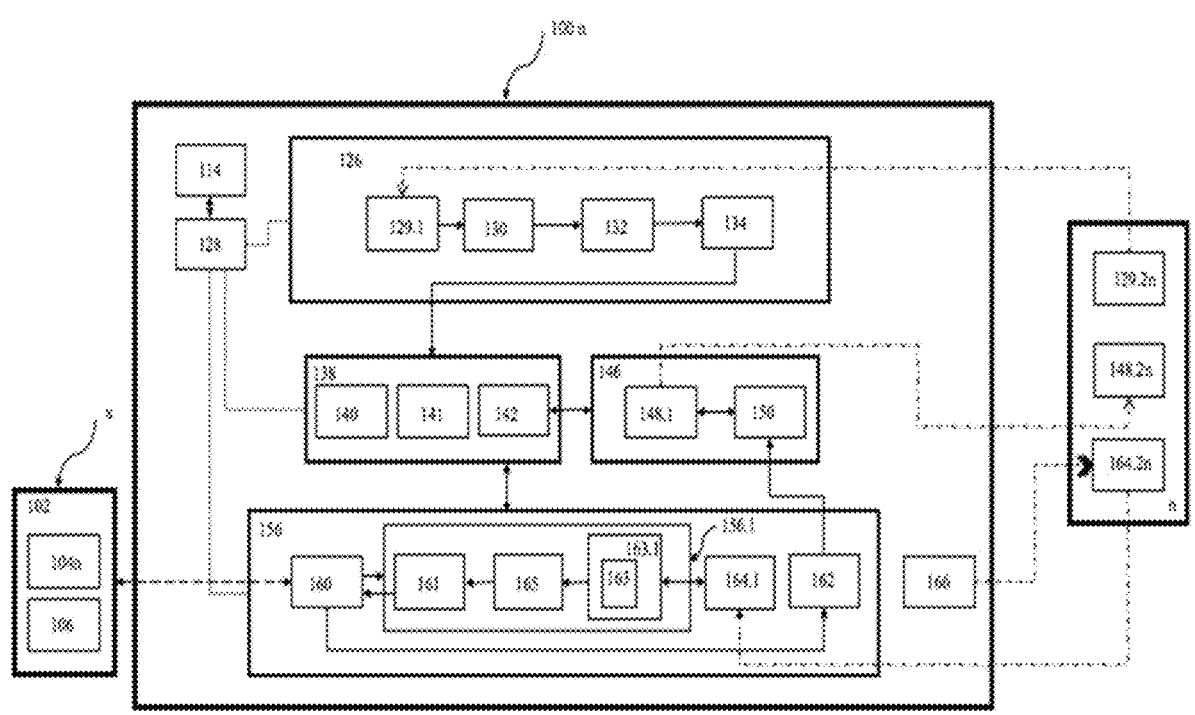
FIG. 2 illustrates a block diagram of a system (100n) in FIG. 1 for generating and sending personalized campaign messages, in accordance with an embodiment of the present disclosure.
Figure 3:
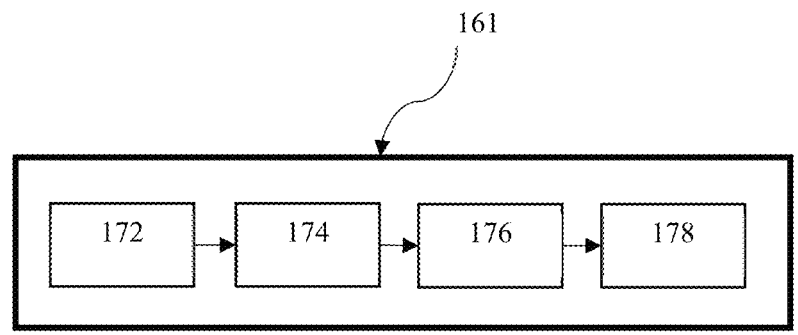
Figure 4:
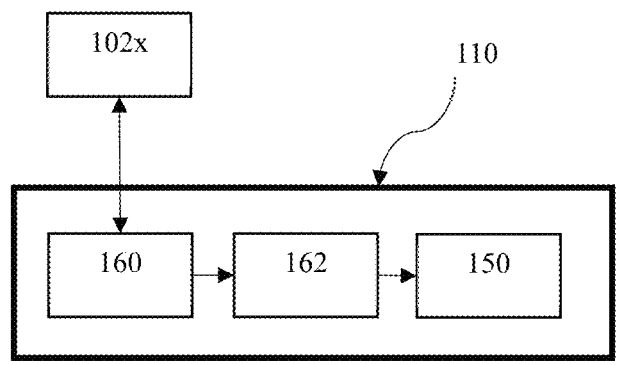
Figure 5:
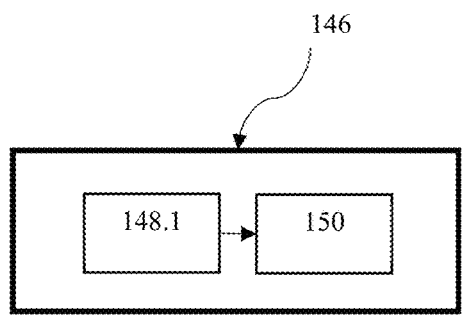
Figure 6:
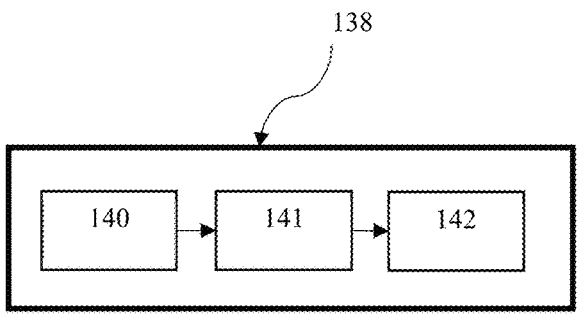
Figure 7:
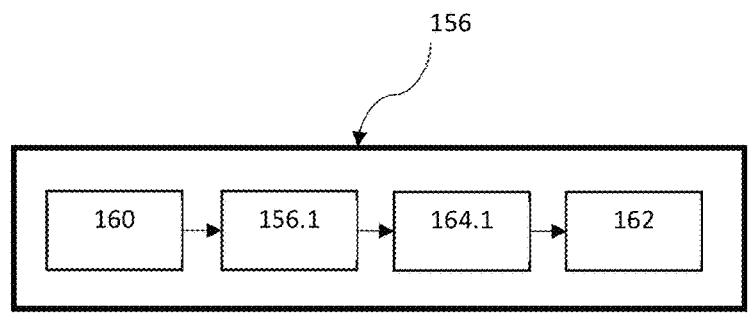
Figure 8:
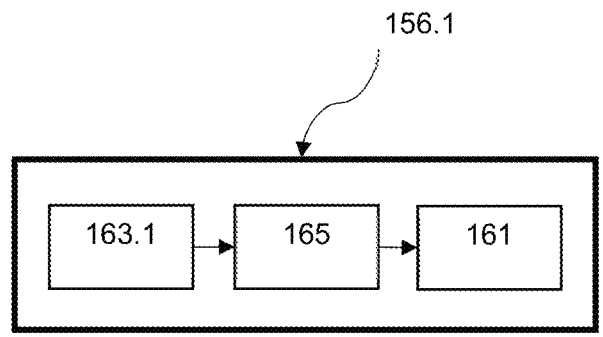
Figure 9:
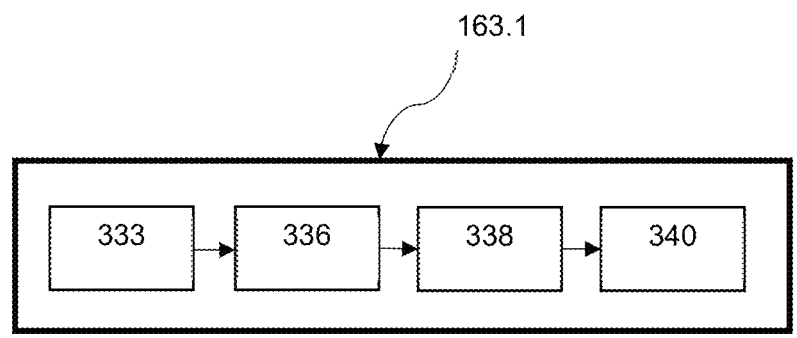
Figure 10:
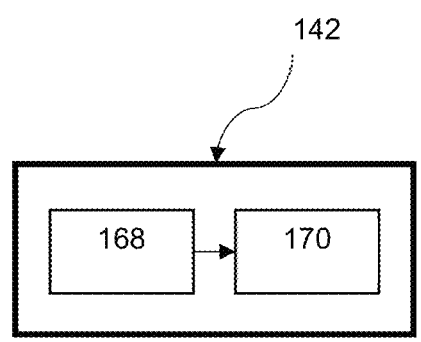
Figure 11A:
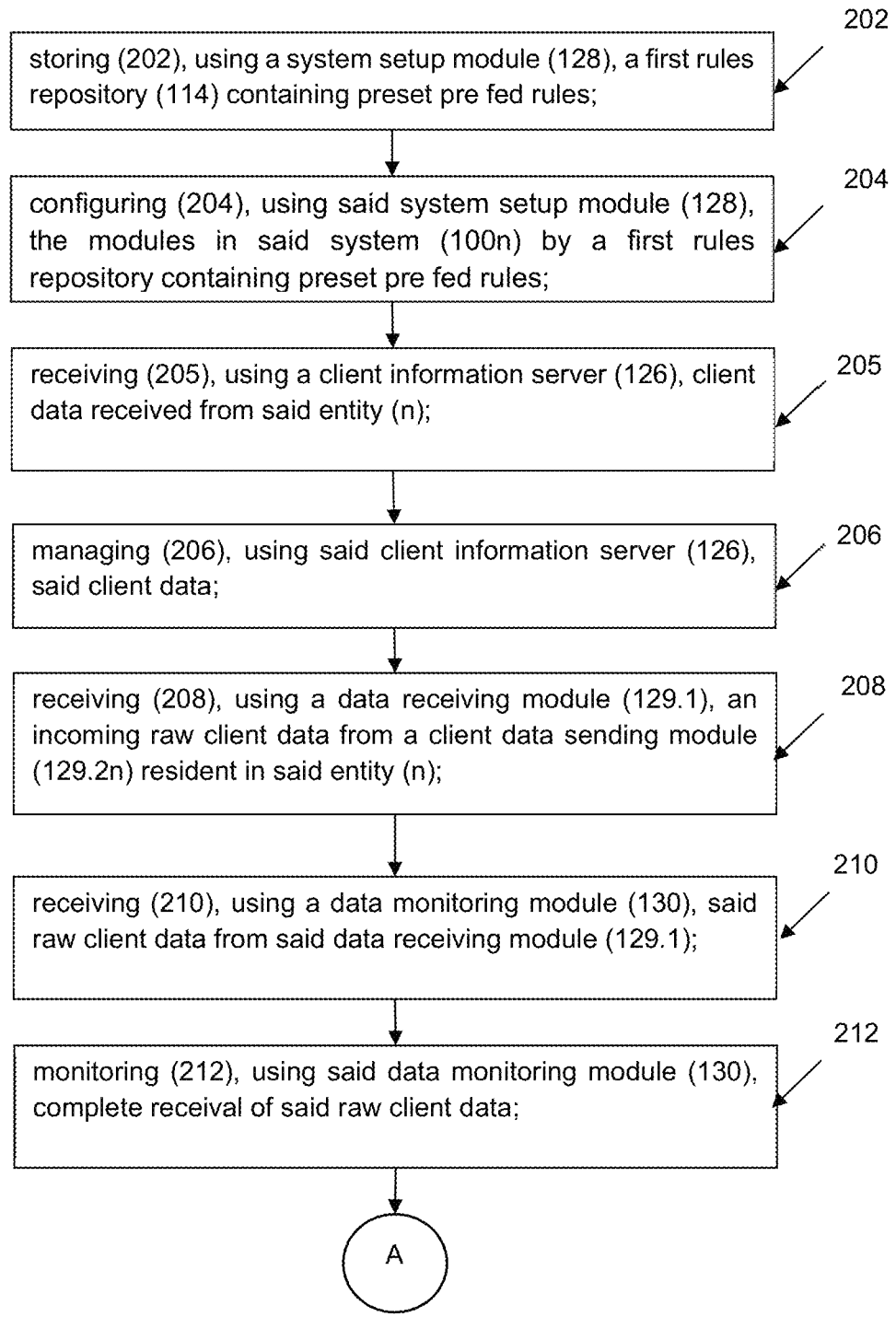
Figure 11B:
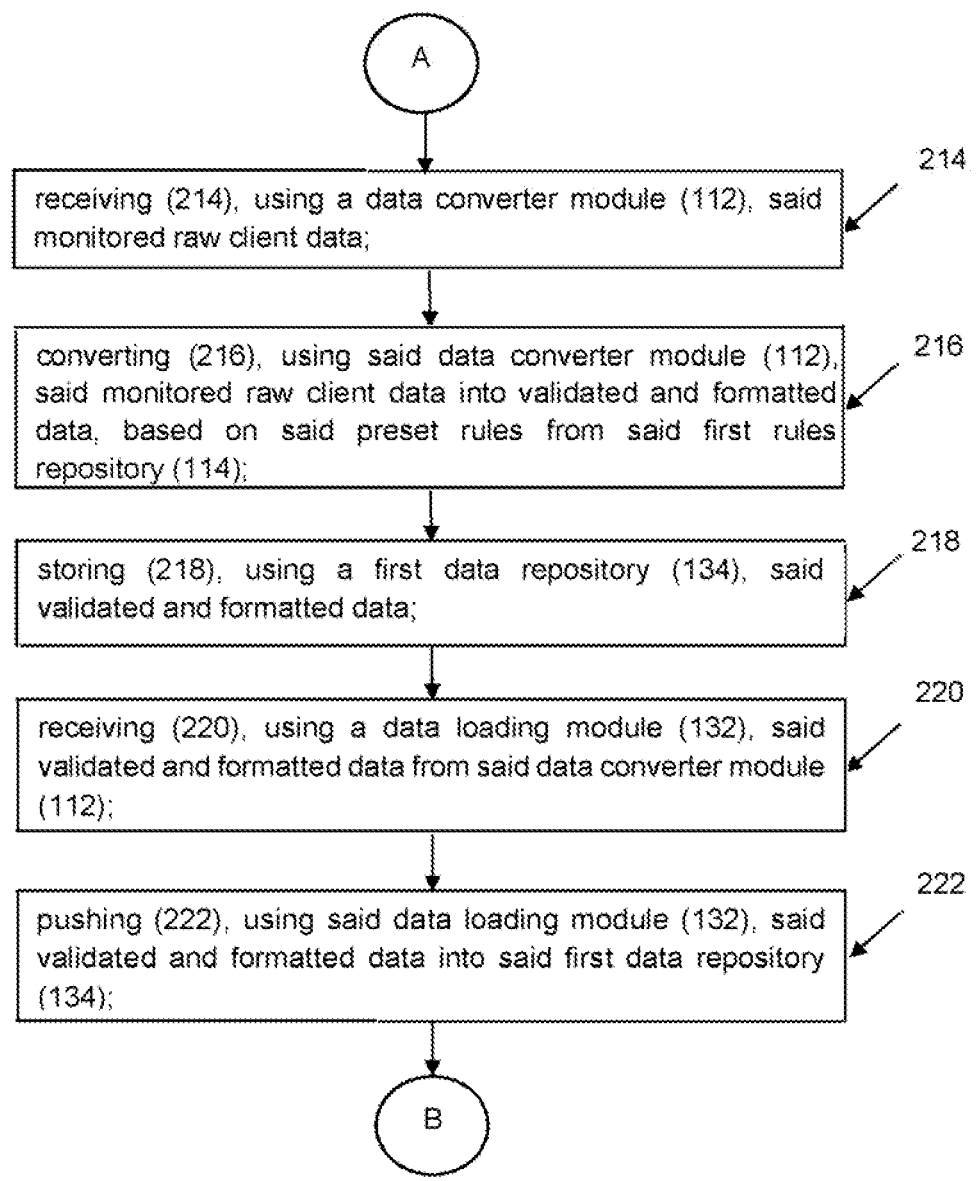
Figure 11C:
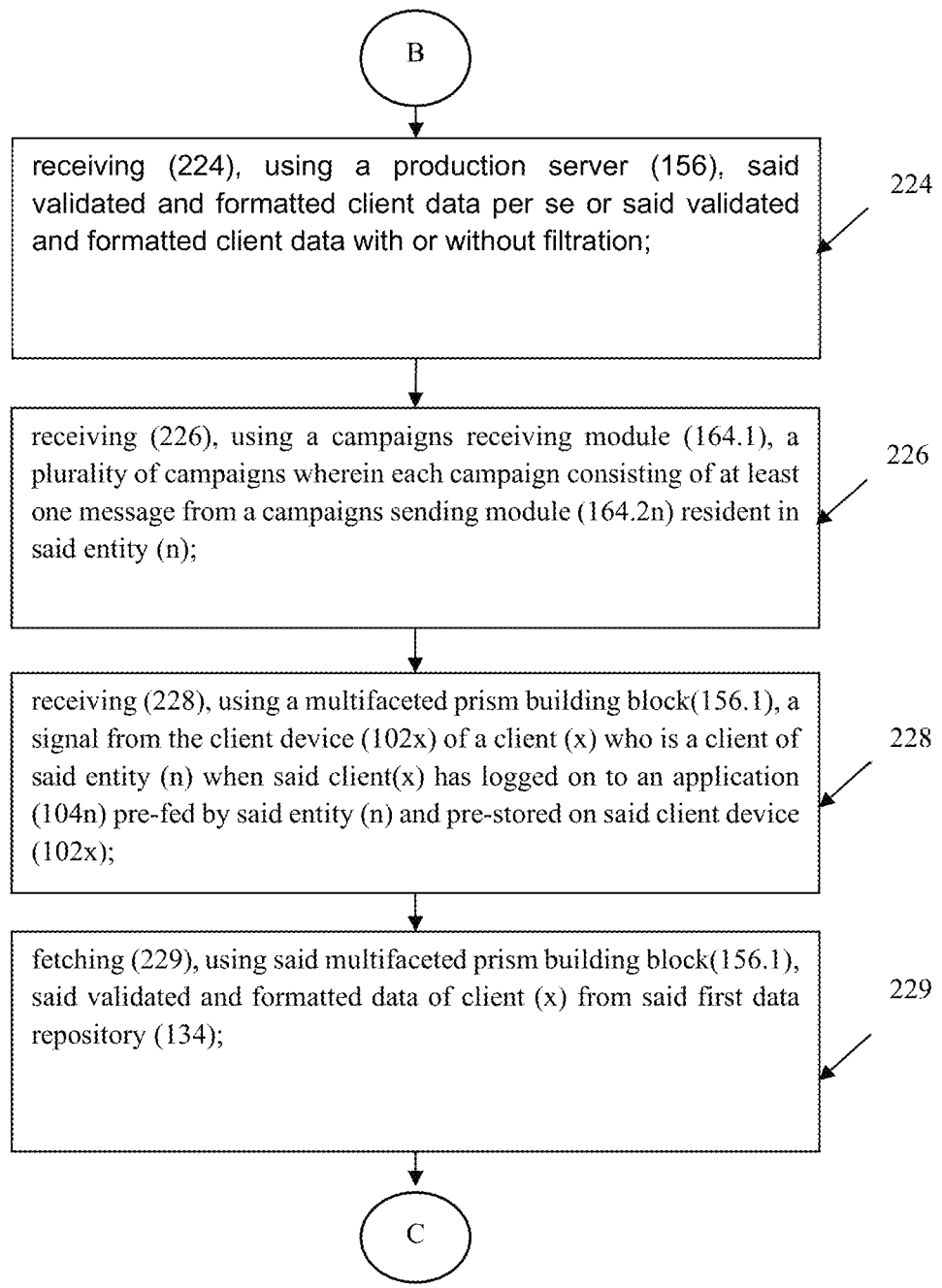
Figure 11D:
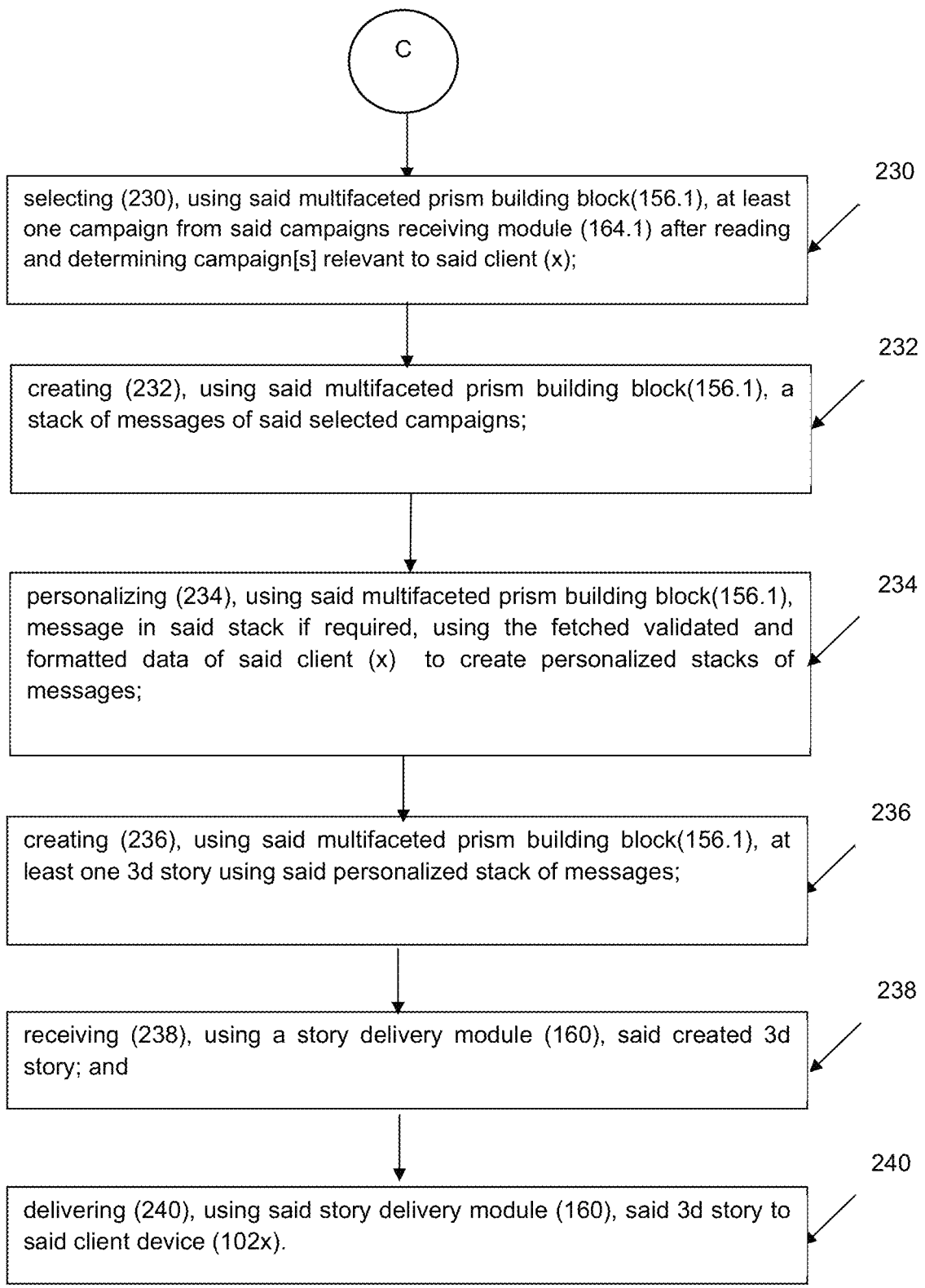
Figure 12:
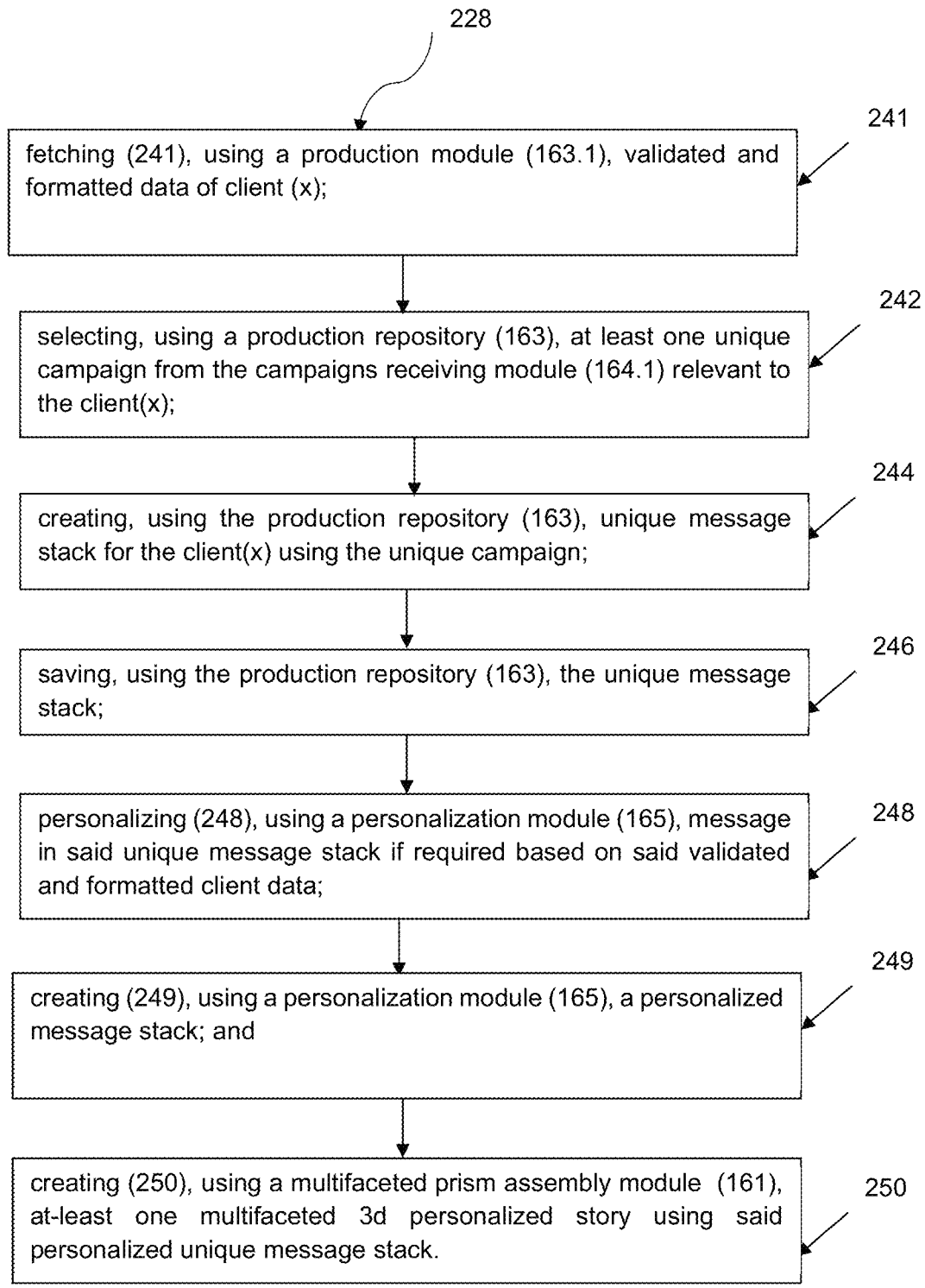
Figure 13:
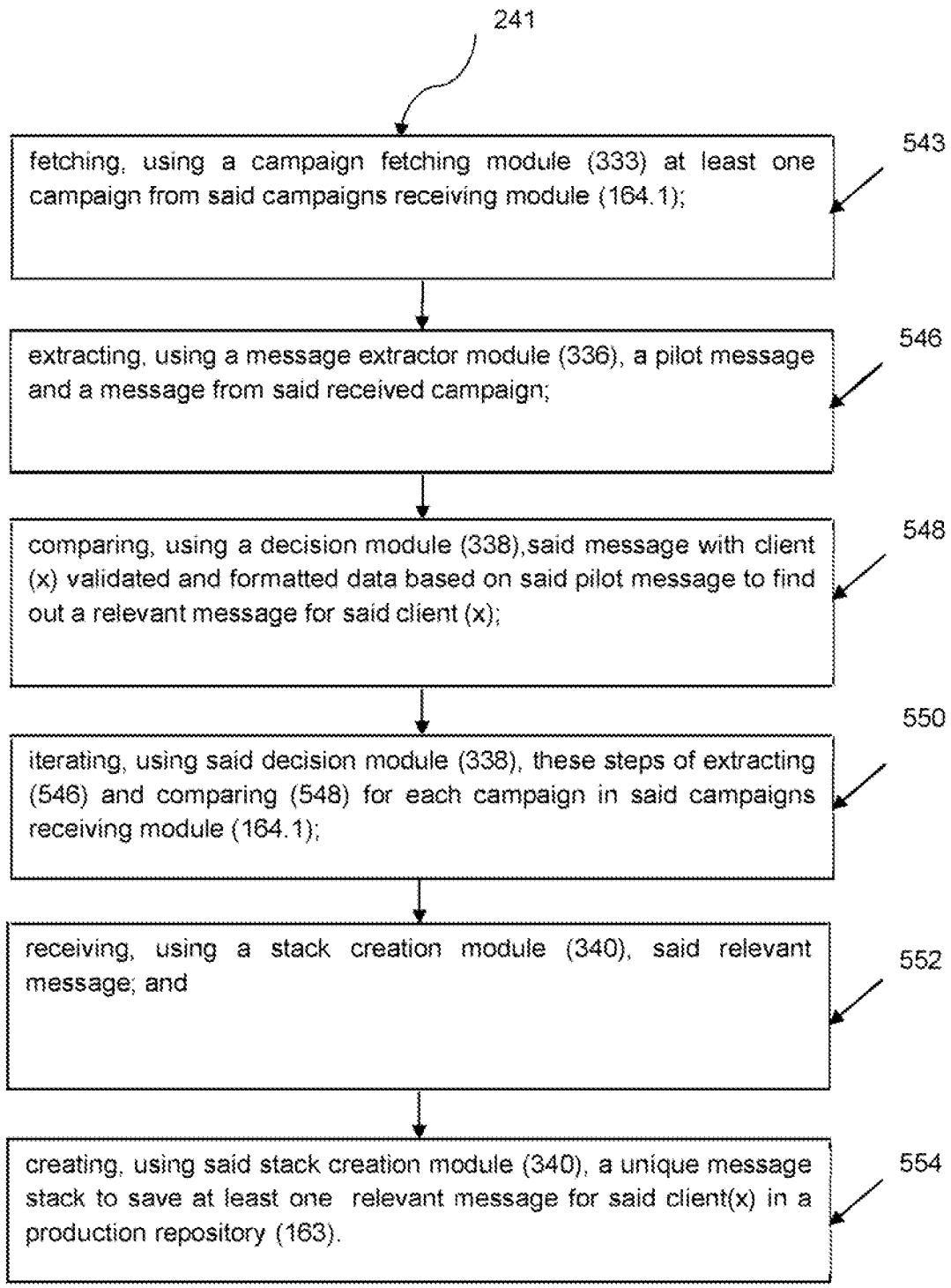
Figure 14:
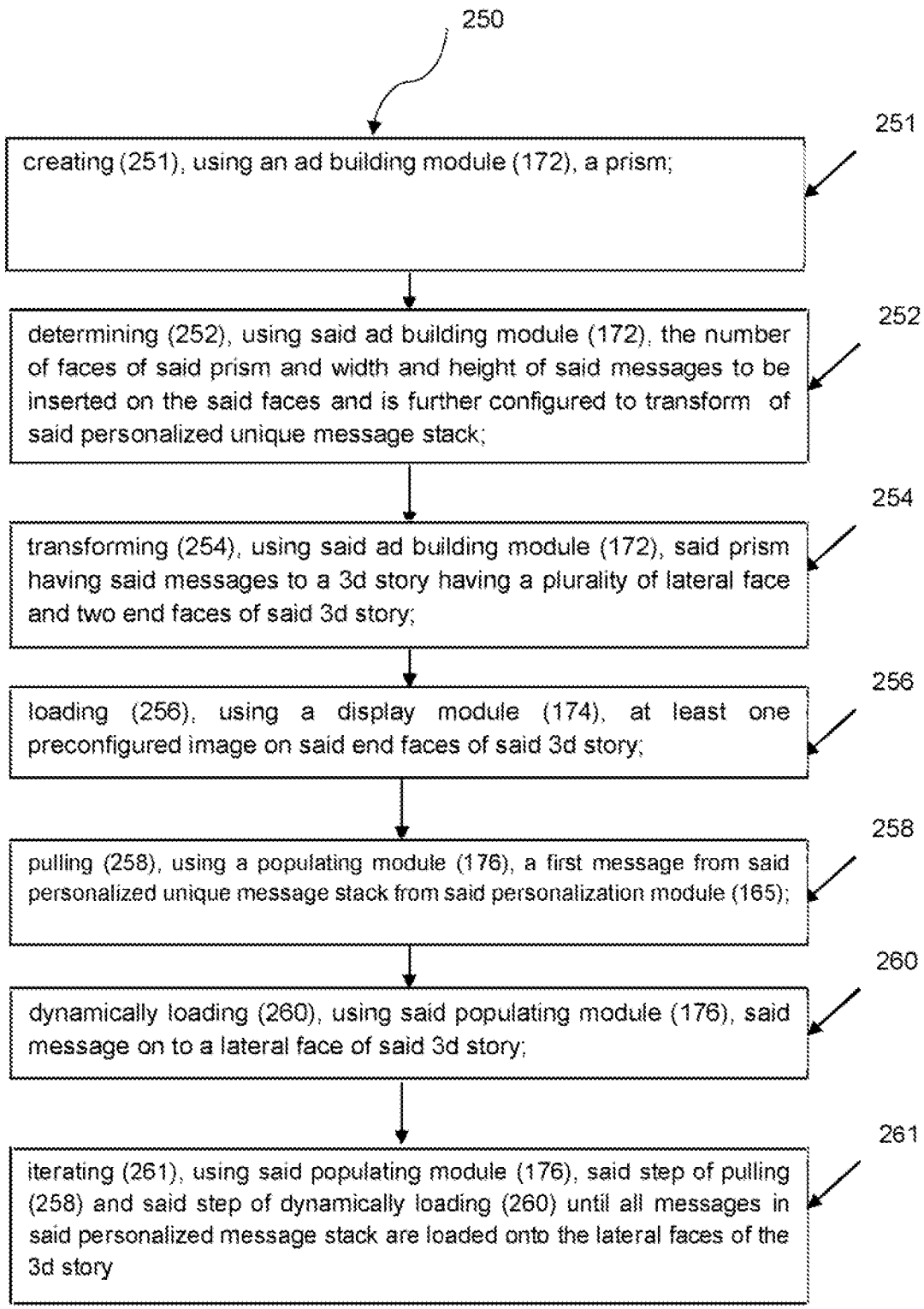
Figure 15:
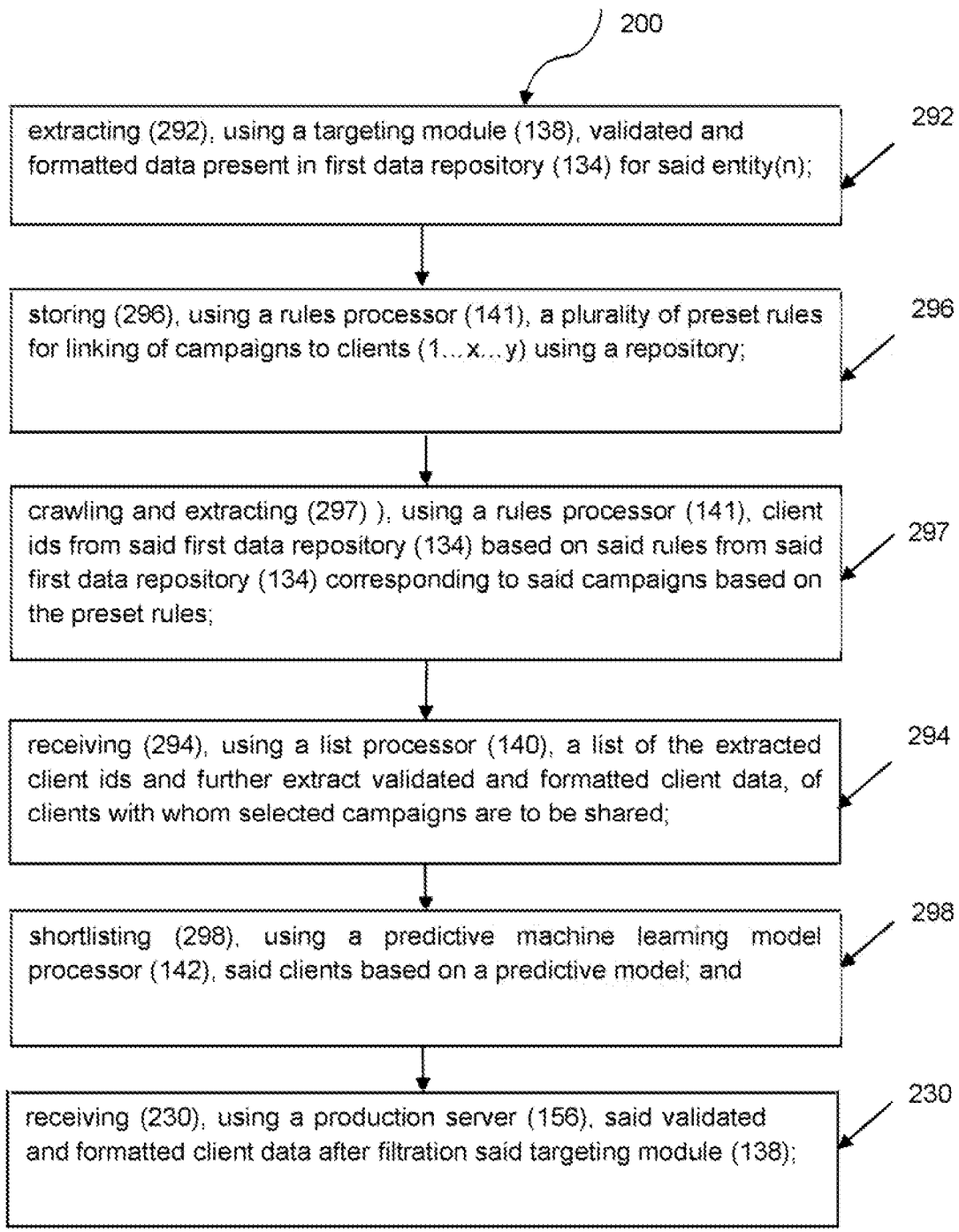
Figure 16:
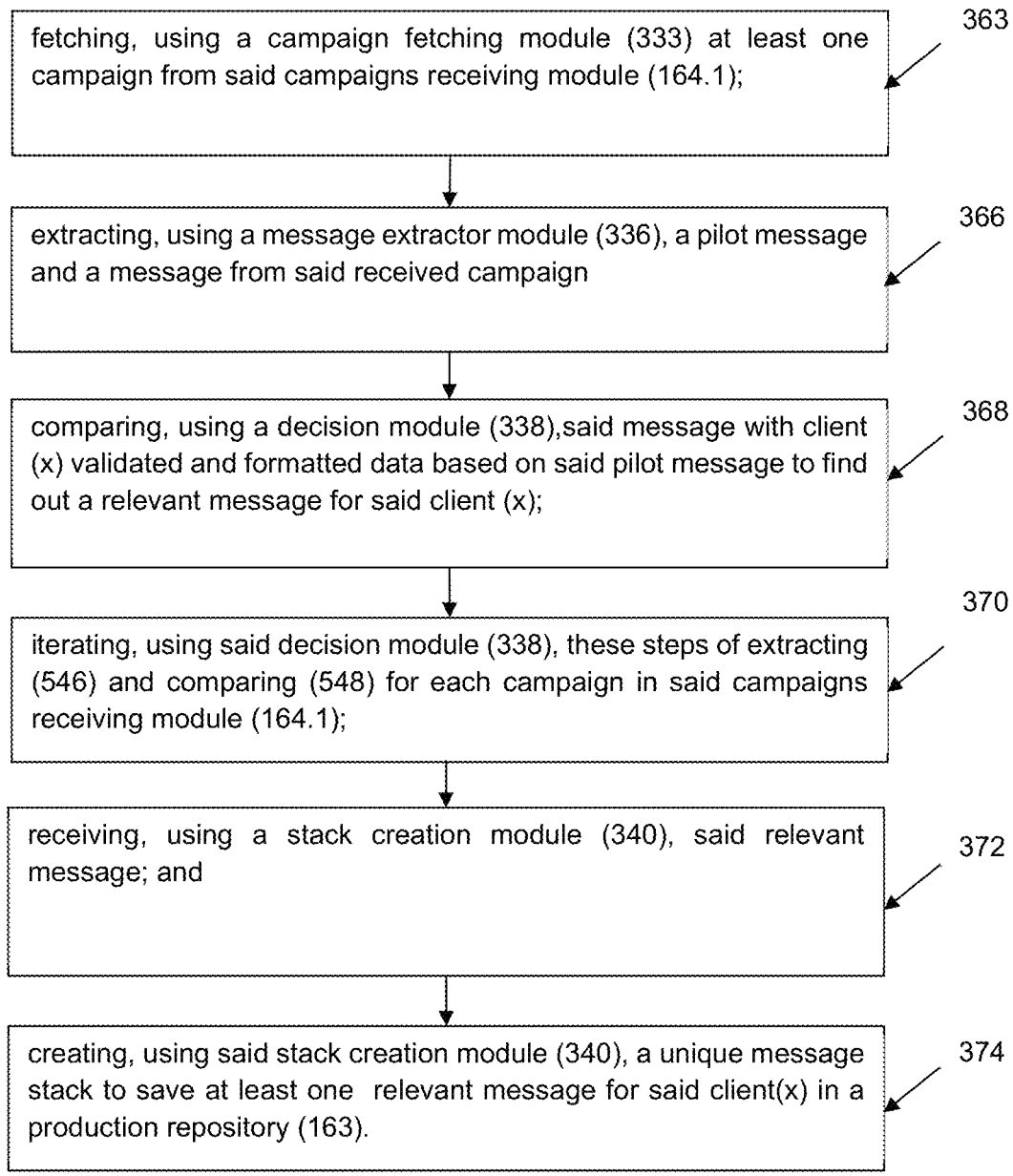
Figure 17:
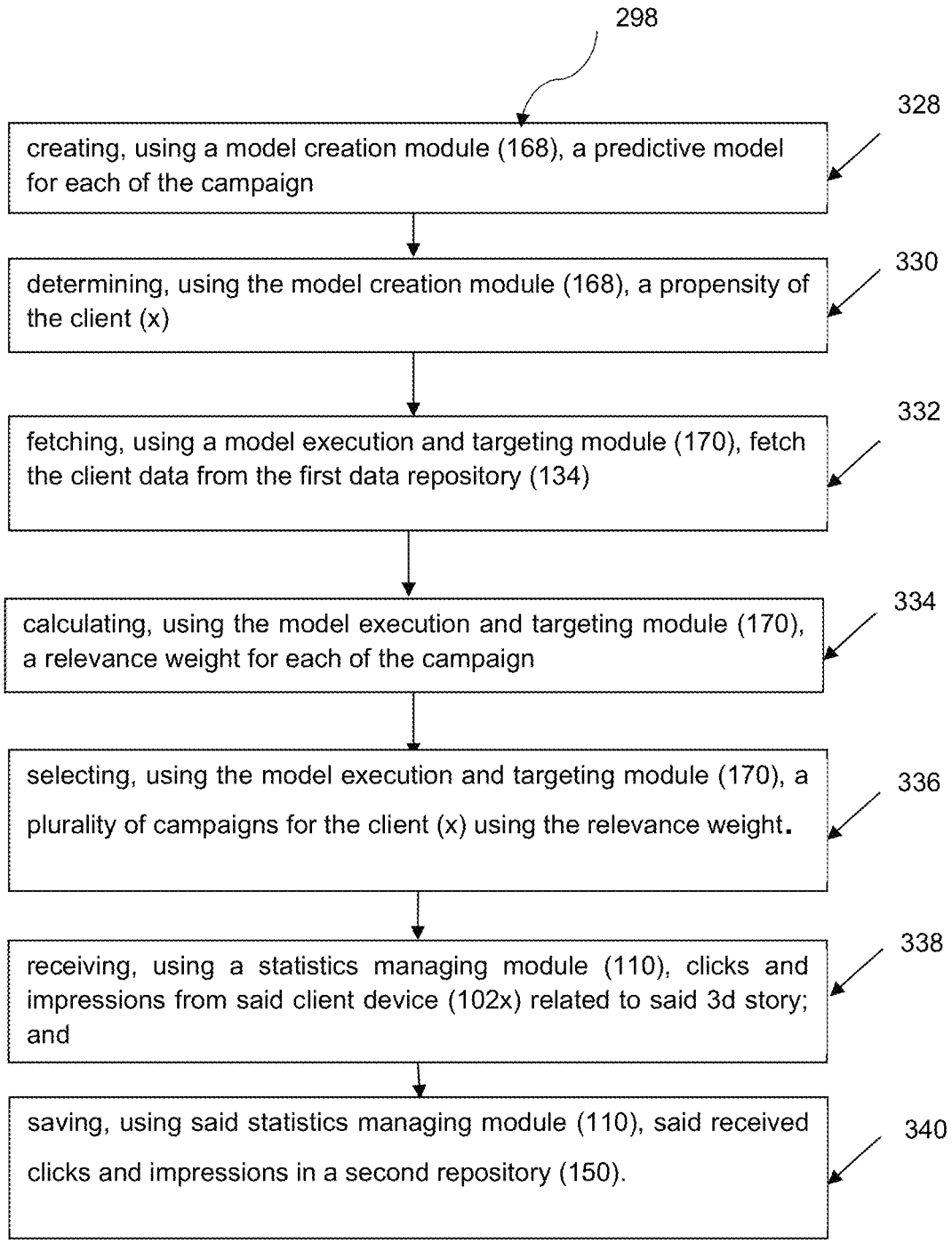
Figure 19A:
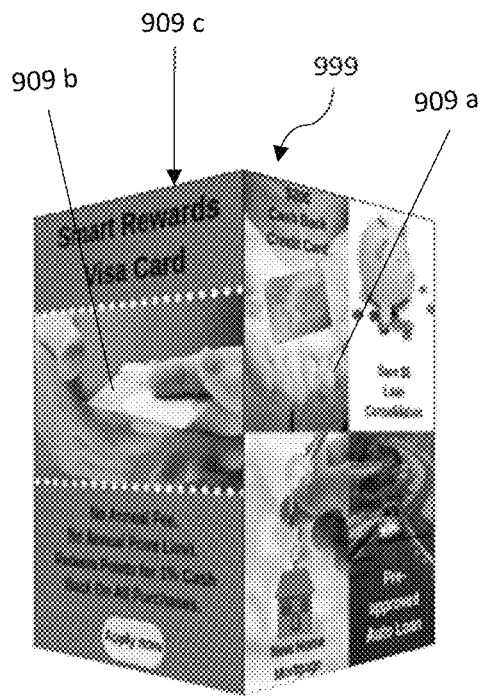
Figure 19B:
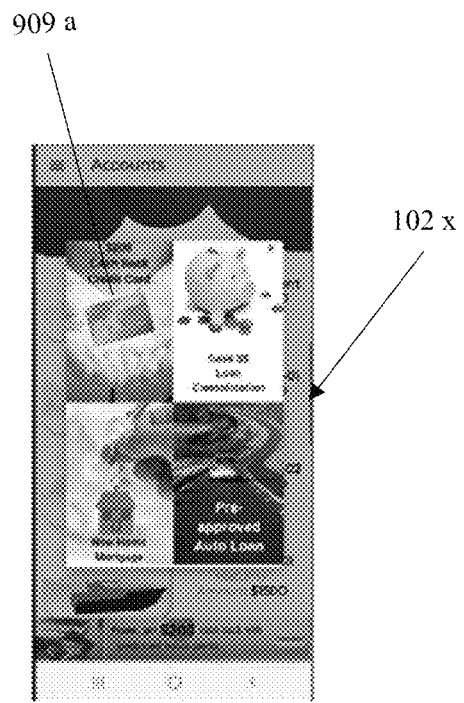

FIG. 2.1 illustrates a multifaceted prism (909) for generating and sending personalized campaign messages, in accordance with an embodiment of the present disclosure;

FIG. 3 illustrates a block diagram of a multifaceted prism assembly module (161) in FIG. 2 of a system for generating and sending personalized campaign messages, in accordance with an embodiment of the present disclosure;

FIG. 4 illustrates a block diagram of a statistics managing module (110) of a system for generating and sending personalized campaign messages, in accordance with an embodiment of the present disclosure;

FIG. 5 illustrates a block diagram of a performance statistics module (146) in FIG. 2 of a system for generating and sending personalized campaign messages, in accordance with an embodiment of the present disclosure;

FIG. 6 illustrates a block diagram of a targeting module (138) in FIG. 2 of a system for generating and sending personalized campaign messages, in accordance with an embodiment of the present disclosure;

FIG. 7 illustrates a block diagram of the production server (156) in FIG. 2 of a system for generating and sending personalized campaign messages, in accordance with an embodiment of the present disclosure;

FIG. 8 illustrates a block diagram of a multifaceted prism building block (156.1) in FIG. 2 of a system for generating and sending personalized campaign messages, in accordance with an embodiment of the present disclosure;

FIG. 9 illustrates a block diagram of a production module (163.1) in FIG. 2 of a system for generating and sending personalized campaign messages, in accordance with an embodiment of the present disclosure;

FIG. 10 illustrates a block diagram of a predictive machine learning model processor (142) in FIG. 2 of a system for generating and sending personalized campaign messages, in accordance with an embodiment of the present disclosure;

FIGS. 11a to 11d illustrate a flow chart for generating and sending personalized campaign messages, in accordance with an embodiment of the present disclosure;

FIG. 12 illustrates a flow chart for a step of receiving (238) using said multifaceted prism building block (156.1) of method (200) in FIG. 11a-11d for generating and sending personalized campaign messages, in accordance with an embodiment of the present disclosure;

FIG. 13 illustrates a flow chart for a step of selecting (242), using said production module (163.1) of method (200) in FIG. 11a-11d for generating and sending personalized campaign messages, in accordance with an embodiment of the present disclosure;

FIG. 14 illustrates a flow chart for a step of creating (250) using a multifaceted prism assembly module (161) of method (200) in FIG. 11a-11d for generating and sending personalized campaign messages, in accordance with an embodiment of the present disclosure;

FIG. 15 illustrates a flow chart for a step of method (200) for generating and sending personalized campaign messages, in accordance with an embodiment of the present disclosure;

FIG. 16 illustrates a flow chart for a step of selecting (318), using said production module (163.1) of method (200) in FIG. 15 for generating and sending personalized campaign messages, in accordance with an embodiment of the present disclosure;

FIG. 17 illustrates a flow chart for a step of shortlisting (298) using said predictive machine learning model processor (142) of method (200) in FIG. 15 for generating and sending personalized campaign messages, in accordance with an embodiment of the present disclosure;

Figure 18:
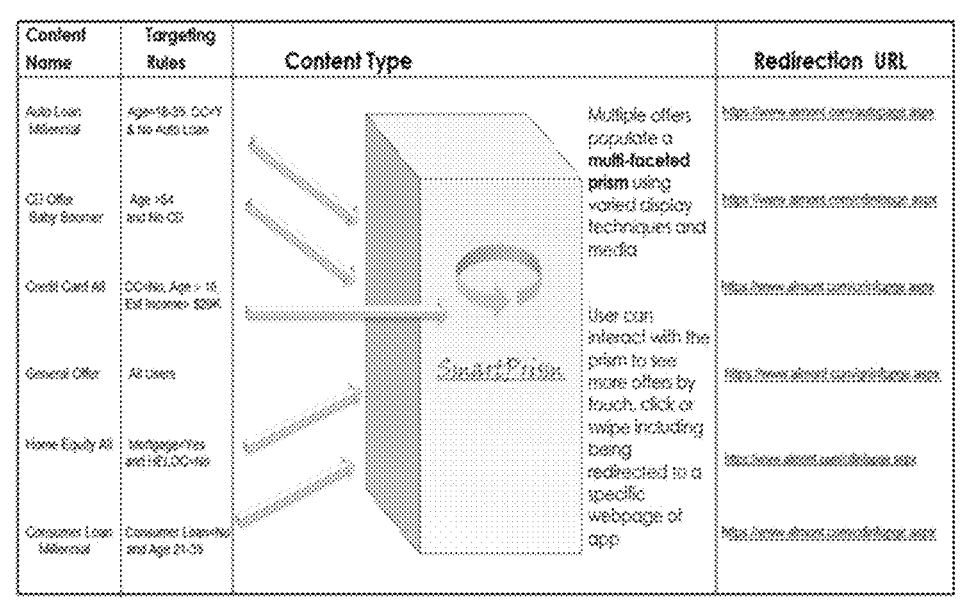

FIG. 18 illustrates a rules processor of FIG. 1, in accordance with an embodiment of the present disclosure; and FIGS. 19a-19b illustrate an example of a 3d story created with content on each face of a multifaceted prism (909), in accordance with an embodiment of the present disclosure.

LIST OF REFERENCE NUMERALS

100—Network of Systems, 100n—System, 102—Client Device, 104—Application, 106—Authentication Module, 126—Client Information Server, 128—System Setup Module, 129.1—Data Receiving Module, 129.2—Client Data Sending Module, 130—Data Monitoring Module, 112—Data Converter Module, 132—Data Loading Module, 134—First Data Repository, 138—Targeting Module, 140—List Processor, 141—Rules Processor, 142—Predictive Machine Learning Model Processor, 146—Performance Statistics Module, 148.1—Statistics Generation Module, 148.2—Statistics Visualization Module, 150—Second Repository, 156—Production Server, 156.1—A Multifaceted Prism Building Block, 160—Story Delivery Module, 161—A Multifaceted Prism Assembly Module, 162—Stats Delivery Module, 163—Production Repository, 163.1—Story Delivery Module, 164.1—Campaigns Receiving Module, 164.2—Campaigns Sending Module, 165—Personalization Module, 166—Template Repository, 168—Model Creation Module, 170—Model Execution and Targeting Module, 172—Ad Building Module, 174—Loading Module, 176—Populating Module, 178—Redirection Module, 333—A Campaign Fetching Module, 336—Message Extractor Module, 338—A Decision Module, 340—Stack Creation Module, 111—Third repository, 909—Multifaceted Prism, 999—3d story.

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details, are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open ended transitional phrases and therefore specify the presence of stated features, elements, modules, units and/or components, but do not forbid the presence or addition of one or more other features, elements, components, and/or groups thereof. The particular order of steps disclosed in the method and process of the present disclosure is not to be construed as necessarily requiring their performance as described or illustrated. It is also to be understood that additional or alternative steps may be employed.

Businesses/Companies in various industries display their offers and discounts on the company's website, within their product (or application) or simply send messages to the user using traditional direct mail (printed media) or electronic mail (email). These mass marketing strategies—instead of engaging the user have often served to turn them off. The user often ignores the ever-blinking and flashing messages they see on websites or applications these offers and messages often consume the entire screen of the website or the application and leave users annoyed and irritated rather than motived to purchase a product. Further, the user may not even relate to the messages displayed, and tend to ignore reading all the messages because of this stratagem. Moreover, a lot of users stop using, visiting the websites or accessing their application because of the non-relevant nature of these mass messages. Users tend to perceive them to be repetitive, tedious and boring and therefore fail to respond to these messages and sometimes even delete or block them not necessarily because they are non-relevant but they are repetitive and based on their past experiences where they may be re-directed to another marketing website.

To avoid this, a system (hereinafter referred to as "system 100") and a method (hereinafter referred to as "method 200") for generating and sending personalized campaign messages, of the present disclosure is described with reference to FIG. 1 through FIG. 19b.

In a typical environment there are multiple entities. The entity can be any business, typically a bank, a financial institution, a building society, an insurance company or a lending corporation. Every entity has a number of clients. A client may be a client of one or more entities.

In one embodiment, the entities can be represented by a set {1 . . . n . . . z} and any one of the entities in the set can be represented by a general entity (n). A large number of clients can be associated with the entity (n). A set of clients associated with entity (n) can be represented as a set {1 . . . x . . . y} and any one of the client can be generally represented by the client(x). The client (x) can be a client of one or more entities.

In one embodiment in accordance with this disclosure, each entity of the set {1 . . . n . . . z} is associated with a system. All systems constitute a network designated by the reference numeral (100). Therefore the network constitutes {1 . . . n . . . z} items. Each system in the network corresponds to one entity. For the entity (n) we can arbitrarily select one system (100n). Assuming a client (x) is a client of entity (n) the client will have preloaded, on its client device (102), an application (104n) in relation to said entity (n). Every application (104) is unique to an entity; Therefore the application (104n) is unique to entity(n). It is understood that the client (x) may be a client of more than one entity.

In the present disclosure, referring to FIG. 1, there is envisaged a network (100) of systems {1 . . . n . . . z} for generating and sending personalized campaign messages from a plurality of entities {1 . . . n . . . z} to a plurality of clients {1 . . . x . . . y}, wherein each of the client is a client of at least one of the entities and each system in the network (100) is associated with one entity in a one to one correspondence.

It is further envisaging that each of the clients has a client device (102) in which is configured an application (104n) associated with at least one entity (n) of the plurality of entities {1 . . . n . . . z} to which the client belongs.

A system (100n) in the network (100), the system (100n) being represented by the general block diagram of which is shown in FIG. 2, is associated with the entity (n).

In an embodiment, the system (100n) is advantageously implemented in at least one computer.

In an embodiment, said application (104n) can be one of a downloadable application or a web based application.

In an embodiment, said application (104n) can be installable in a client device such as a smart phone, a laptop, a personal computer, a tab, a laptop, a desktop and the like.

In an embodiment, said client logs onto said downloadable application or said web based application on said client device (102) to access said system only after the client (x) is authenticated by said entity (n) by using an authentication module (106n).

The system (100n) comprises a system setup module (128), a client information server (126) and a production server (156) as shown in the block diagram of FIG. 2.

The system setup module (128) is configured to initiate set up of the modules and repositories in the system (100n), the system setup module (128) having a first rules repository (114) containing pre-set and pre-fed rules.

In an embodiment, the rules can be fed into the repository (114) initially before the system (100n) is hooked up with the entity and even before any data starts streaming from the entity to the system. The system setup module (128) is a sort of initializing module and keeps the whole system in a state of readiness to receive client data and campaigns. It is understood that the system setup module (128) will include an editor (not shown) to edit the pre-set and pre-fed rules to adapt the system (100n) for any updates or upgrades. The editing may be done manually or automatically.

The client information server (126), as shown in block diagram of FIG. 2, can be configured to receive client data from the entity (n) and can be further configured to manage the received client data. The client information server (126) can further comprises a data receiving module (129.1), a data monitoring module (130), a data converter module (112), a first data repository (134) and a data loading module (132).

In one embodiment, the data receiving module (129.1) is configured to receive incoming raw client data from a client data sending module (129.2n) resident in the entity (n).

In one embodiment, the data monitoring module (130) is configured to cooperate with the data receiving module (129.1) to receive raw client data and monitor its complete receival.

In one embodiment, the data converter module (112) can be configured to receive the monitored raw client data, and is further configured to convert the monitored raw client data into validated and formatted data, based on the pre-set and pre-fed rules from the first rules repository (114).

An exemplified pseudo code for data converter module (112) is as follows:

```
Select (data)
    {
    Read {
    monitored raw client data
    }
    Write {
    validated and formatted data, based on the preset rules     }
    }
```

In one embodiment, the first data repository (134), which is in the form of a non-transitory computer storage medium, is configured to store the validated and formatted data.

In one embodiment, the data loading module (132) is configured to receive the validated and formatted data from the data converter module (112) and is further configured to push the validated and formatted data into the first data repository (134).

An exemplified pseudo code for data loading module (132) is as follows:

```
Select (data)
    {
    Read {
    validated and formatted data
    }
    Write {
    push the validated and formatted data
    }
    }
```

As seen in the block diagram of FIG. 2, the production server (156) can be configured to receive the validated and formatted client data per se or the validated and formatted client data after filtration.

In one embodiment of the present disclosure, the production server (156) comprises a campaigns receiving module (164.1) and a multifaceted prism building block(156.1)

Again as seen in the block diagram of FIG. 2, the campaigns receiving module (164.1) can be configured to receive a plurality of campaigns wherein each campaign consists of at least one message from a campaigns sending module (164.2n) resident in the entity (n).

An important feature of the present disclosure which is represented by block (156.1) is the multifaceted prism building block (156.1).

The multifaceted prism building block (156.1) can be configured to perform various tasks. For instance, the block can receive a signal, from the client device (102x) of a client (x) who is a client of the entity (n) when the client(x) has logged on to an application (104n) pre-fed by the entity (n) and pre-set on the client device (102x). Further the block (156.1) can fetch the validated and formatted data of client (x) from the first data repository (134), can select at least one campaign from the campaigns receiving module (164.1) after reading and determining campaign[s] relevant to the client (x), and is also able to create a stack of messages of the selected campaigns.

An exemplified pseudo code for multifaceted prism building block (156.1) is as follows:

```
Select (task)
{
Read {
signal
}
Write {
    validated and formatted data of client
}
}
```

Still further, the multifaceted prism building block (156.1) can personalize each message in the stack using the fetched validated and formatted data of the client (x) to create personalized stacks of messages. It can further create a 3d story (999) in a multifaced prism (909) using the personalized stack of messages as shown in FIG. 19a and FIG. 19b.

An exemplified pseudo code for multifaceted prism building block (156.1) is as follows:

```
Select (message)    {
    Read {
        personalize each message in the stack using the fetched
        validated and formatted data of the client
    }
    Write {
        create a 3d story in a multifaced prism
    }
}
```

In an embodiment of the system (100n) of the disclosure, the multifaceted prism building block (156.1) comprises a production module (163.1), a personalization module (165) and a multifaceted prism assembly module (161).

Typically, the production module (163.1) is configured to fetch validated and formatted data of client (x) and select at least one unique campaign from the campaigns receiving module (164.1) relevant to the client (x) and is further configured to create and save a unique message stack for the client (x) in a production repository (163), which is in the form of a non-transitory computer storage medium.

An exemplified pseudo code for production module (163.1) is as follows:

```
Select (fetch data)
{
Read {
    unique campaign from the campaigns receiving module relevant to
    the client
}
```

```
Write {
    create and save a unique message stack for the client
}
}
```

In an embodiment, the campaign receiving module (164.1) is configured to cooperate with the campaigns sending module (164.2n) to receive campaigns designed by the entity (n).

In an embodiment, the production module (163.1) includes a campaign fetching module (333), a message extractor module (336), a decision module (338) and a stack creation module (340).

In an embodiment, the campaign fetching module (333) is configured to fetch campaigns from the campaigns receiving module (164.1).

In an embodiment, the message extractor module (336) is configured to extract a pilot message and a campaign message from the received campaign. The pilot message being a message selected from a group of pilot messages consisting of: an urgent message that overrides all the campaigns and make that campaign mandatory for all clients; a non-discrete message that is mandatory for all clients along with other optional campaigns; and a filter message that would subject the received campaign to filtration.

An exemplified pseudo code for message extractor module (336) is as follows:

```
Select (message)
    {
    do{
        extract a pilot message and a message from the received campaign
    }
    While {
        an urgent message that overrides all the campaigns and make that
        campaign mandatory for all clients.
        a non-discrete message that is mandatory for all clients along with
        other optional campaigns.
        a filter message that would subject the received campaign to
        filteration.
    }
}
```

In an embodiment, an urgent message could be "server on maintenance date-X and time-Y" would override all campaigns and make that campaign mandatory for all clients.

In an embodiment, a non-discrete message could be "Happy new year" message that is required to be pushed to all clients along with other campaign messages.

In an embodiment, a filter message could be "client age >30 AND client salary >$500000" such client is eligible for an auto loan at 5% rate.

In one embodiment of the present disclosure, the decision module (338) can be configured to compare the campaign messages with validated and formatted data of client (x) based on the pilot message to find out a relevant message for the client (x) and is further configured to iterate this process for each campaign received in the campaigns receiving module (164.1).

An exemplified pseudo code for decision module (338) is as follows:

```
Select (message)
    {
    Read {
```

```
compare the campaign messages with validated and formatted data
to find out a relevant message
   }
Write {
   iterate this process for each campaign received
   }
}
```

In one embodiment of the present disclosure, the stack creation module (340) can be configured to receive the relevant message from the decision module (338) and can be further configured to create a unique message stack and save at least one relevant message for the client(x) in the unique message stack.

An exemplified pseudo code for stack creation module (340) is as follows:

```
Select (message)
   {
   Read {
      receive the relevant message
      }
   Write {
      create a unique message stack and save at least one relevant message
      }
   }
```

In one embodiment of the present disclosure, the personalization module (165) can be configured to personalize messages in the unique message stack, based upon requirement, using the validated and formatted client data and is further configured to create a personalized message stack.

In an embodiment, the personalization module (165) is configured to insert the client(x)'s first name dynamically at least at one appropriate place in a message dynamically, in order to personalize the at least one message in the message stack if the message is required to be personalized.

In one embodiment of the present disclosure, the multifaceted prism assembly module (161) is configured to create at least one multifaceted prism (909) and load the personalized messages on the faces of the multifaceted prism (909) using the personalized message stack.

An exemplified pseudo code for populating module (176) is as follows:

```
Select (pull message)
   {
   Read {
      dynamically load the message on to a lateral face of the multifaceted prism
      }
   Write {
      iterate this dynamic message loading process upon sensing client(x)'s swipe gesture
      }
   }
```

In an embodiment, the multifaceted prism assembly module (161) includes an ad building module (172), a loading module (174) and a populating module (176) as shown in block diagram of FIG. 3.

In one embodiment of the present disclosure, the ad building module (172) is configured to create a prism, and is further configured to determine and create the number of faces of the prism to create a multifaceted prism (909) as shown in FIG. 2.1 and determine width and height of the messages to be inserted on the faces of said multifaceted prism (909).

In one embodiment of the present disclosure, the loading module (174) is configured to load at least one preconfigured image on at least one end face of the multifaceted prism (909), typically the operative top end face.

In one embodiment, the populating module (176), as shown in block diagram of FIG. 3, can be configured to pull a message from the personalized unique message stack stored in the personalization module (165) and can be further configured to dynamically load the message on to a lateral face of the multifaceted prism (909) to create a 3d story (999) and can still be further configured to iterate this dynamic message loading process upon sensing client(x)'s swipe gesture while hovering over the 3d story (999) onto the fixed number of lateral faces of the multifaceted prism.

In an embodiment, the multifaceted prism assembly module (161) further includes a redirection module (178) that can be configured to identify a stroking or swiping gesture of the client (x) on client device (102x) when the client(x) hovers over the 3d story (999) and can be further configured to redirect the client (x) to a pre-set URL or to a preconfigured image based on the gesture.

In an embodiment of the present disclosure, the system (100n) further includes the story delivery module (160) which is configured to receive the created 3d story (999) from the multifaceted prism building block (156.1) and is further configured to deliver the 3d story (999) to the client device (102x).

In an embodiment, the system (100n) further comprises a statistics managing module (110) which is configured to receive clicks and impressions from the client device (102x) related to the 3d story (999) and is further configured to save the received clicks and impressions in a second repository (150).

The statistics managing module (110) includes a receiver (not shown), the second repository (150) and a stats delivery module (162) as shown in the block diagram of FIG. 4.

The receiver (not shown) in the story delivery module (160) is configured to receive clicks and impressions related to the 3d story (999) from the client device (102x).

The second repository (150), as seen in the block diagrams of FIG. 1 and FIG. 4, can be configured to receive the clicks and impressions from the receiver (not shown) and is further configured to store the impressions and clicks data corresponding to the client(x) and the campaigns.

The second repository (150), can be a non-transitory computer storage medium.

The stats delivery module (162), as seen in the block diagrams of FIG. 1 and FIG. 4, can be configured to cooperate with the receiver (not shown) of the story delivery module (160) to receive the clicks and impressions and is further configured to push the impressions and clicks data to the second repository (150).

In an embodiment, the system (100n) further includes a performance statistics module (146) is configured to process the plurality of impressions and clicks stored in a second repository (150) of the client and is further configured to generate a plurality of performance reports in relation to a campaign and is further configured to transmit the reports to the entity (n).

An exemplified pseudo code for performance statistics module (146) is as follows:

```
Select (impressions)
    {
    Read {
        process the plurality of impressions and clicks
    }
    Write {
        generate a plurality of performance reports and transmits the
reports
        to the entity
    }
    }
```

In an embodiment of the present disclosure, the performance statistics module (146) includes the second repository (150) and a statistics generation module (148.1) as shown in block diagram of FIG. 5.

In an embodiment of the resent disclosure, the second repository (150) can be configured to cooperate with the stats delivery module (162) to receives the impressions and clicks data of the client (x) and is further configured to store the impressions and clicks data.

In an embodiment of the present disclosure, the statistics generation module (148.1) can be configured to send a performance report of the campaign to the entity (n).

In accordance with another aspect of this disclosure, there is provided a targeting module (138) in a network (100) of systems {1 . . . n . . . z} for generating and sending personalized campaign messages from a plurality of entities {1 . . . n . . . z} to a plurality of clients {1 . . . x . . . y}, wherein each of the client is a client of at least one of the entities and each system in the network (100) is associated with one entity in a one to one correspondence, wherein each of the client has a client device (102) in which is configured an application (104n) associated with at least one entity (n) of the plurality of entities {1 . . . n . . . z}, to which the client belongs.

In an embodiment, the system (100n), associated with the entity (n) in the network (100) can be implemented in at least one computer. The system (100n) comprises a system setup module (128), a client information server (126), a production server (156), a story delivery module (160) along with the targeting module (138).

In accordance with the second aspect of this disclosure, the system setup module (128), the client information server (126), a data receiving module (129.1), The data monitoring module (130), The data converter module (112), The first data repository (134), The data loading module (132), The production server (156), The campaigns receiving module (164.1), campaigns sending module (164.2n), The multifaceted prism building block (156.1), the production module (163.1), campaign fetching module (333), a message extractor module (336), a decision module (338), a stack creation module (340), The personalization module (165), the multifaceted prism assembly module (161), an ad building module (172), a loading module (174), a populating module (176), the second repository (150) and the story delivery module (160) they work in the same fashion as described above with reference to the first aspect of this disclosure.

In accordance with the second aspect of this disclosure, the targeting module (138) can be configured to filter and extract validated and formatted data present in the first data repository (134) for the entity(n) includes a rules processor (141), a list processor (140) and a predictive machine learning model processor (142) as shown in block diagram of FIG. 6.

In accordance with the second aspect of this disclosure, the rules processor (141) comprises a third repository (111) which is configured to store and save a plurality of pre-set targeting rules for linking of campaigns to clients {1 . . . x . . . y} and further includes a crawler and extractor pair (not shown) which is configured to crawl upon the first data repository (134) and extract client ids based on the pre-set targeting rules from the first data repository (134) corresponding to the campaigns based on the pre-set targeting rules.

In an embodiment, the rules processor (141) is configured to execute the targeting rules based on multiple combinations of operators from 'AND', 'OR', 'NOT', 'greater than', 'equal to', 'not equal to', 'less than', 'not less than' and the like as shown in FIG. 18.

In an embodiment, the rules processor (141) is configured to use one of the targeting rules to extract the client id from the first data repository (134) that qualifies for one of the targeting rules.

In an embodiment, the list processor (140) is configured to receive a list of the extracted client ids and further configured to extract validated and formatted client data, of clients with whom selected campaigns are to be shared.

In accordance with the second aspect of this disclosure, the predictive machine learning model processor (142) is configured to shortlist clients based on a predictive model.

The predictive machine learning model processor (142) includes a model creation module (168) and a model execution and targeting module (170) as shown in block diagram of FIG. 10.

The model creation module (168) can be configured to cooperate with the second repository (150) to create a predictive model for each of the campaigns and is further configured to determine propensity of the clients.

The model execution and targeting module (170) is configured to cooperate with the first data repository (134) to fetch the client data to calculate a relevance weight for each of the campaigns and is further configured to select a plurality of campaigns for the clients using the relevance weight.

An exemplified pseudo code for model execution and targeting module (170) is as follows:

```
Select (fetch data)
    {
    Read {
        calculate a relevance weight for each of the campaigns
    }
    Write {
        select a plurality of campaigns for the client using the relevance
weight
    }
    }
```

In an embodiment, said data sending module (129.2n), said campaign sending module (164.2n) and said statistics visualization module (148.2n) are configured to be accessed by an authorized user of the entity (n).

In an embodiment, the system (100n) further includes a template repository (166) that can be configured to store images, fonts, campaign templates and is configured to be accessible by designs for the entity(n) for designing campaign.

In an embodiment, the system(100n) being implemented using at least one processor.

Referring to FIGS. 11a to 11d and FIG. 12, in accordance with another aspect of the disclosure, there is disclosed a method (200) for generating and sending personalized campaign messages from the plurality of entities {1 ... n ... z} to the plurality of clients {1 ... x ... y}, wherein each of said client is a client of at least one of said entities wherein each of said client has a client device (102) in which is configured an application (104n) associated with at least one entity (n) of said plurality of entities {1 ... n ... z}, to which said client belongs.

The method (200) comprises a series of steps. Before the commencement of the method (200) the rules for carrying the method (200) are pre-set and pre-fed in the first rules repository (114).

For executing the method (200), the system setup module (128) sets up all the modules and repositories using the pre-set and pre-fed rules in the first rules repository (114).

All the modules and repositories setup are configured to be executable.

Raw client data is received from the client data sending module (129.2n) resident in the entity (n) into the data receiving module (129.1).

The raw client data is monitored to ensure that there is complete receival. This step is monitored by the data monitoring module (130).

The complete received raw data is converted into validated and formatted data based on the pre-set and pre-fed rules from the first rules repository (114). This step is carried out by data converter module (112).

The validated and formatted data is stored in the first data repository (134) using the data loading module (132).

A production server (156) is provided.

The validated and formatted client data per se or said validated and formatted client data with or without filtration is pulled into to production server (156).

A plurality of campaigns are received in the campaigns receiving module (164.1). These campaigns are sent by the campaigns sending module (164.2n) resident in said entity (n) to the campaigns receiving module (164.1).

Parallelly, the multifaceted prism building block (156.1) receives a signal from the client device (102x) of the client (x) who is a client of said entity (n) when said client(x) has logged on to the application (104n) pre-fed by said entity (n) and pre-stored on said client device (102x). This signal from the client device (102x) is received by the block (156.1) via the story delivery module (160).

On receipt of the login signal from the client's device (102x) the block (156.1) fetches the validated and formatted data of client (x) from said first data repository (134).

The multifaceted prism building block (156.1) sequentially selects campaigns from the campaigns receiving module (164.1) and reads and determines whether a campaign is relevant for the client (x).

The production module (163.1) in the multifaceted prism building block (156.1) creates a stack of messages of the selected campaigns.

The personalization module (165) in the multifaceted prism building block (156.1) personalizes each message in said stack if required, using the fetched validated and formatted data of said client (x) to create a personalized stacks of messages.

Parallelly, the ad building module (172) in the multifaceted prism building block (156.1) is provided which creates a dynamically displaceable multifaceted prism (909), as shown in FIG. 2.1, whose number of lateral faces and end faces and dimensions, width and height are determined by the message to be applied to the lateral faces.

The loading module (174) in the multifaceted prism building block (156.1) loads a preconfigured image on at least one end face (909c), as shown in FIG. 2.1, of the created prism (909).

Messages are pulled one by one from the personalized unique message stack and each pulled message is populated by means of a populating module (176) on a lateral face of the prism (909). This pulling and populating process is iterated to create a 3d story (999) on the multifaceted prism (909).

The 3d story (999), on the multifaceted prism (909), is delivered to the client device (102x) to enable to client (x) to view and dynamically displace the faces of the prism to view the 3d story (999). In one embodiment the 3d story is delivered to the client (x) in realtime. Further, after personalization the 3d story is a smart 3d story.

Clicks and impressions from said client device (102x) during viewing of the 3d story (999) are captured in the story delivery module (160) and transmitted to the stats delivery module (162).

The clicks and impressions received in the stats delivery module (162) are pushed to a second repository (150).

Referring to FIG. 13, within the production module (163.1) the method (200) of this aspect includes the steps of: fetching, using a campaign fetching module (333) at least one campaign from said campaigns receiving module (164.1); extracting, using a message extractor module (336), a pilot message and a campaign message from said received campaign, wherein the pilot message is a message selected from a group of pilot messages consisting of: an urgent message that overrides all the campaigns and makes said received campaign mandatory for all clients; a non-discrete message that makes said received campaign mandatory for all clients along with other optional campaigns; and a filter message that would subject said received campaign to filtration using at least one of the processors (140, 141, 142) or the processors (140, 141, 142) in combination in the targeting module (138); comparing, using the decision module (338), the campaign message with the validated and formatted data of client (x) based on said pilot message to determine a message relevant for said client (x); iterating, using said decision module (338), these steps of extracting and comparing for each campaign received in the campaigns receiving module (164.1) to identify relevant messages; The relevant messages are received in a stack creation module (340) and a unique message stack is created contains at least one relevant message. and the stack is loaded in the production repository (163). The production repository (163) can be a transient computer medium.

Referring to FIG. 14, the method (200) further includes the steps of:
creating, using a multifaceted prism assembly module (161) and the ad building module (172) to first create a prism (909); determining, using said ad building module (172), the number of faces of said prism (909) and width and height of said messages to be inserted on the said faces; transforming, said personalized unique message stack using said ad building module (172) to a 3d story (999) on the lateral faces of the prism (909); and loading, using a display module (174), at least one preconfigured image on at least one end face, of said 3d story (999).

The step of transforming the personalized unique message stack to the 3d story (999) includes the steps of using a populating module (176) to pull a message one by one from said personalized unique message stack and dynamically loading, using said populating module (176), said pulled messages on to the lateral faces of said prism (909) to make the 3d story (999). The pulling and loading action is iterated by the populating module (176) until all messages in said personalized message stack are loaded onto the lateral faces of the 3d story (999).

Referring to FIG. 15, in a second aspect of the present disclosure, the method (200) for generating and sending personalized campaign messages from a plurality of entities {1 . . . n . . . z} to the plurality of clients wherein each of said client is the client of at least one of said entities wherein each of said client has the client device (102) in which is configured the application (104n) associated with one entity (n) of said plurality of entities {1 . . . n . . . z}, to which said client belongs, comprises the following steps: extracting, using a targeting module (138), validated and formatted data present in the first data repository (134) for said entity(n); storing, using a rules processor (141), a plurality of preset targeting rules for linking of campaigns to clients {1 . . . x . . . y} using a third repository (111); crawling and extracting, using the targeting rules processor (141), client ids from said first data repository (134) based on said targeting rules from said first data repository (134) corresponding to said campaigns based on the pre-set targeting rules; receiving, using a list processor (140), a list of the extracted client ids and further extract validated and formatted client data, of clients with whom selected campaigns are to be shared; shortlisting, using a predictive machine learning model processor (142), said clients based on a predictive model; and receiving, using a production server (156), said validated and formatted client data after filtration by said targeting module (138).

Referring to FIG. 16, The method (200) further includes the steps of fetching using a campaign fetching module (333) at least one campaign from said campaigns receiving module (164.1); extracting, using a message extractor module (336), a pilot message and a campaign message from said received campaign.

The pilot message can be a pilot message selected from a group of pilot messages consisting of: an urgent message that overrides all the campaigns and make that campaign mandatory for all clients; a non-discrete message that is mandatory for all clients along with other optional campaigns; and a filter message that would subject said received campaign to filtration using at least one of the processors (140, 141, 142) or the processors(140, 141, 142) in combination in the targeting module (138).

The method (200) further includes the steps of comparing, using a decision module (338), the campaign message with the validated and formatted data of the client (x) and based on the pilot message determine a message relevant for said client (x). This comparison is iterated using the decision module (338) for each campaign received in the campaigns receiving module (164.1).

The method (200) still further includes, receiving all the messages determined to be relevant by the decision module (338) in a stack creation module (340) and creating, using said stack creation module (340), a unique message stack containing at least one relevant message for said client(x). This stack creation module (340) is resident in the production repository (163).

Referring to FIG. 17, the method (200) can further include the steps of using said predictive machine learning model processor (142) to shortlist a message that ought to be delivered to client (x).

The process of shortlisting, includes the steps of creating, using a model creation module (168), a predictive model for each of said campaigns. Fetching said client data from said first data repository (134).

Fetching, using a model execution and targeting module (170), a campaign from the campaigns receiving module (164.1). Determining, using said model creation module (168), a propensity of the client (x) and; shortlisting campaigns relevant to said client (x) based on the determined propensity.

The method (200) can further include, calculating, using said model execution and targeting module (170), a relevance weight for each of said campaigns; and selecting, using said model execution and targeting module (170), a plurality of campaigns for said client (x) using said relevance weight.

The relevance weight is determined by the statistics Generation Module (148.1).

In both aspects of the disclosure, the statistics generation module is configured to generate and send at least one report to the entity, that report includes: an influenced conversion report which is configured to chart a plurality of new accounts opened by the new clients that have been influenced by a view of the campaign and therefore click on at least one of the personalized messages of the campaign; a campaign category analytics report is configured to share the campaign performance across all the campaigns or within a selected category of the campaign; a monthly management report is configured to encapsulate the client engagement performance results directly related to the campaigns published within past five calendar months; a key engagement indicator is configured to display an average number of the clients logged on to produce at least one click and is further configured to provide an alert if the average number is greater than a pre-determined threshold; a category report is configured to display all the campaigns in each of the categories via a donut chart; and a views report is configured to display the most viewed campaigns, typically in the past 7 days.

In an embodiment, the statistics generation module is further configured to send a performance metrics to provide an overall view of a status of the data and the campaigns, the performance metrics include: data freshness configured to display the number of days since the last day the data was uploaded; and campaign freshness configured to display an average age of the campaign.

In an embodiment, the statistics generation module is further configured to send an ad stats today in real-time, that includes: total number of impressions today as well as the highest number of impressions seen in the last 30 days; today clicks—shows number of clicks today; and campaign alert—shows a campaign more than 90 days old or is trending down.

In an embodiment, the statistics generation module is configured to generate reports where data can be seen on a device resident in the entity (n) in an application and can be exported to the entity (n) typically as one of a .csv, a .xls or a .png file.

In an embodiment of the method (200), the campaign performance information can be displayed in one of a bar graph, a donut chart, an historical view or a tabular view.

In an exemplary embodiment, a 3d story (999) as shown in FIG. 19a and FIG. 19b can be created using said system (100n). FIG. 19b shows an actual client device (102x) screen on which the 3d story (999) is displayed with messages relevant to the client (x). Lateral faces of the 3d story (999) can be moved by a swiping gesture by the client (x) on client device (102x). A gesture of swiping right is represented in FIG. 19a where two lateral faces (909a) and (909b) are shown. Both faces (909a) and (909b) form a three dimensional multifaceted representation of the 3d story (999). User can swipe in either direction and the 3d story can rotate on its axis to show various faces carrying unique relevant messages for client (x). These relevant messages for a client (x) are dynamically shortlisted by the system (100n) based on the client (x)'s propensity and other factors related to the client (x) and/or campaigns offered by the entity (n).

For example, Tina is a young girl, studying in high school. She is in process of applying for further studies. When Tina logs on to her bank's application (104n) using her phone (102x) and it authenticates Tina using an authentication module (106n). If the login is successful the system (100n) is signaled by the application (104n) and the system starts to go through its campaigns stored in (164.1). These campaign messages are shortlisted for Tina based on rules that her bank decided, like (if client(x)'s age <=23 AND profession ="student") offer education loan hence, message like "an education loan offer for you, at 10% for a limited time" is shortlisted for Tina. These shortlisted messages are temporality stored in a stack and then are personalized for Tina, like "Hi Tina! An education loan offer for you, at 10% for a limited time" and all such personalized shortlisted messages are stored in a stack.

Now based on the number of these personalized shortlisted messages for a client (x), which is Tina in this case, number of faces and dimensions of the multifaceted prism is calculated and an empty multifaceted prism (909) is created as shown in FIG. 2.1. Then the personalized relevant messages for Tina are loaded into this multifaceted prism (909) to form a 3d story (999). This story is pushed to Tina's device (102x) using the interface of her bank's application (104n), as shown in FIG. 19b. It gives a captivating, personalized and transformative user experience to Tina which is engaging. Now, Tina swipes right to see the next message in her 3d story. The three dimensional prism rotates on its axis to show her the second face of her 3d story that is dynamically loaded with another message for her using the personalized shortlisted messages present in stack. She can go through all the faces of the 3d story to see all messages/offers for her and can choose to click on one she would want to explore further. This click can redirect her to a website where she can find out more about that offer and also can apply for that loan.

In accordance with another exemplary embodiment, entity can share a list of client ID's with whom a particular campaign is to be shared, hence the client ids are entity directed.

For example, Maria is working with a multinational company. Maria's bank decides to offer her a loan and to a list of other young employees. When Maria logs on to her bank's application using her phone, it authenticates Maria using an authentication module. After the authentication is successful the system is signaled by the application and the system starts to go through its campaigns stored in 164.1. Due to the intelligence of list processor Maria would get the offer shortlisted by her bank e.g. personalized campaign message like "Maria! Time to buy your dream home, home loan @3.9% for a limited time." is stacked for Maria. Along with this message other messages too can be shortlisted based on other pilot messages, for Maria and are stored in a stack.

Now based on the number of these shortlisted messages for Maria, number of faces and dimensions of the multifaceted prism is calculated and an empty multifaceted prism is created as shown in FIG. 2.1. Then the personalized relevant messages for Maria are loaded into this multifaceted prism to form a 3d story. This story is pushed to Maria's device using the interface of her bank's application.

She can go through all the faces of the 3d story to see all messages/offers for her and can choose to click on one she would want to explore further. This click can redirect her to a website where she can find out more about that offer and also can apply for that loan.

In accordance with another exemplary embodiment, Predictive model is used to identify a campaign suitable for a client.

Ricky is a middle aged successful entrepreneur. He has a taste for cars and changes his cars often. When Ricky logs on to her bank's application, after authenticating Ricky, the system is signaled by the application. This system starts to go through its campaigns stored in 164.1. Due to the intelligence of predictive model this system can calculate and identify Ricky's propensity towards high end cars. The system shortlists a few offers on buying a new car for Ricky. These messages are like "Buy this new beast at a loan rate you can't resist, click below to know how". Along with this message other messages too can be shortlisted for Ricky and are stored in a stack. System can also personalize this message for Ricky if required.

Now based on the number of these shortlisted messages, number of faces and dimensions of the multifaceted prism is calculated and an empty multifaceted prism is created. Then the relevant messages for Ricky are loaded into this multifaceted prism to form a 3d story. This story is pushed to Ricky's device using the interface of her bank's application.

Going through all the faces of the 3d story he can choose to click on any message that would redirect him to a website. He can apply for that loan on the given website.

All the interactions of clients like swiping and clicking on the 3d story is recorded and stored in a repository. Now the Bank can generate various reports based on the saved data of client interaction with the 3d story. They can take various business decisions using such reports which can be based on various campaigns that they offered to their clients and evaluate its performance.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

Technical Advancements

The present disclosure described herein above has several technical advantages including, but not limited to, the realization of a system for generating and sending personalized campaign messages and a method thereof that: dynamically delivers personalized campaign messages to potentially significant numbers of clients; utilizes customer/business intelligence to create relevant messages for each client; allows each client to move through multi-faceted content so that multiple campaign messages and offers can be presented at one time; react and respond to multiple personalized campaign messages or offers ("content"); interactive with respect to the client reacting and responding to the content provided; and easy to deploy, highly performant and cost-effective.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A network of systems for generating and sending personalized campaign messages from a plurality of entities to a plurality of clients, wherein each of said client is a client of at least one of said entities and each system in said network is associated with one entity in a one to one correspondence, wherein each of said client has a client device in which is configured an application associated with at least one entity of said plurality of entities, to which said client belongs, a system, associated with said entity in said network implemented in at least one computer comprising at least one processor configured to control the following:

i. a system setup module configured to initiate set up of the modules and repositories in said system, said system setup module having a first rules repository containing pre-set and pre-fed rules;

ii. a client information server configured to receive client data from said entity and further configured to manage said client data, said client information server further comprising:
     a data receiving module configured to receive incoming raw client data from a client data sending module resident in said entity;
     a data monitoring module configured to cooperate with said data receiving module to receive said raw client data and monitor its complete receive;
     a data converter module configured to receive said monitored raw client data, and further configured to convert said monitored raw client data into validated and formatted data, based on said pre-set and pre-fed rules from said first rules repository;
     a first data repository, being a non-transitory computer medium, configured to store said validated and formatted data;
     a data loading module configured to receive said validated and formatted data from said data converter module and further configured to push said validated and formatted data into said first data repository;

iii. a production server configured to receive
   said validated and formatted client data per se; or
   said validated and formatted client data after filtration, said production server comprising:
   a campaign receiving module configured to receive a plurality of campaigns wherein each campaign consisting of at least one message from a campaigns sending module resident in said entity;
   a multifaceted prism building block configured to
     receive a signal, from the client device of a client who is a client of said entity when said client has logged on to an application pre-fed by said entity and pre-stored on said client device;
     fetch said validated and formatted data of client from said first data repository;
     select at least one campaign from said campaigns receiving module after reading and determining campaign relevant to said client;
     create a stack of messages of said selected campaigns;
     personalize each message in said stack using the fetched validated and formatted data of said client to create personalized stacks of messages;
     create a 3d story in a multifaced prism using said personalized stack of messages;

iv. a story delivery module configured to receive said created 3d story and further configured to deliver said 3d story to said client device.

2. The system as claimed in claim 1, wherein said multifaceted prism building block comprises:
   a production module configured to fetch validated and formatted data of client and select at least one unique campaign from said campaigns receiving module relevant to said client and further configured to create and save a unique message stack for said client in a production repository;
   a personalization module configured to personalize message in said message stack upon requirement based on said validated and formatted client data and create a personalized message stack; and a multifaceted prism assembly module configured to create at least one multifaceted prism and load personalized messages on the faces of said multifaceted prism using said personalized message stack to create a 3d story.

3. The system as claimed in claim 2, wherein said production module includes:
a campaign fetching module configured to fetch at least one campaign from said campaigns receiving module;
a message extractor module configured to extract a pilot message and a campaign message from said received campaign said pilot message being a message selected from a group of pilot messages consisting of:
a an urgent message that overrides all the campaigns and make that campaign mandatory for all clients;
a a non-discrete message that is mandatory for all clients along with other optional campaigns; and
a filter message that would subject said received campaign to filtration;
a decision module configured to compare said campaign message with validated and formatted data of client based on said pilot message to find out a relevant message for said client and further configured to iterate this process for each campaign in said campaigns receiving module; and
a stack creation module configured to receive said relevant message and further configured to create a unique message stack to save at least one relevant message for said client in a production repository.

4. The system as claimed in claim 2, wherein said personalization module inserts said client's first name dynamically at least at one appropriate place in a message dynamically, in order to personalize said at least one message in said message stack if the message is required to be personalized.

5. The system as claimed in claim 2, wherein said multifaceted prism assembly module includes:
an ad building module configured to create a prism, and further configured to determine and create the number of faces of said prism and width and height of said messages to be inserted on the said faces;
a loading module configured to load at least one preconfigured image on said end faces of said multifaceted prism; and
a populating module configured to pull a message from said personalized unique message stack from said personalization module and further configured to dynamically load said message on to a lateral face of said multifaceted prism to create a 3d story and configured to iterate this dynamic message loading process upon sensing client's swipe gesture while hovering over said 3d story onto the fixed number of lateral faces of the multifaceted prism.

6. The system as claimed in claim 2, wherein said multifaceted prism assembly module further includes a redirection module configured to identify a gesture of said client when said client hovers over said 3d story and further configured to redirect said client to a pre-set URL or to a preconfigured image based on said gesture.

7. The system as claimed in claim 1, further comprises a statistics managing module configured to receive clicks and impressions from said client device related to said 3d story and further configured to save said received clicks and impressions in a second repository.

8. The system as claimed in claim 7, wherein said statistics managing module includes:
a receiver (not shown) in said story delivery module configured to receive clicks and impressions related to said 3d story from said client from said client device;
said second repository configured receive said clicks and impressions from said receiver (not shown) and further configured to store said impressions and clicks data corresponding to said client and said campaigns; and
a stats delivery module configured to cooperate with said receiver (not shown) of said story delivery module to receive said clicks and impressions and further configured to push said impressions and clicks data to said second repository.

9. The system as claimed in claim 1, further includes a performance statistics module configured process said plurality of impressions and clicks stored in a second repository of said client and further configured to generate a plurality of performance reports in relation to a campaign and further configured to transmit said reports to said entity.

10. The system as claimed in claim 9, wherein said performance statistics module includes:
said second repository configured to cooperate with said stats delivery module to receives said impressions and clicks data of said client and further configured to store said impressions and clicks data; and
a statistics generation module configured to send a performance report of said campaign to said entity.

11. The system as claimed in claim 1, wherein said campaign receiving module configured to cooperate with said campaigns sending module to receive said campaign designed by said entity.

12. The system as claimed in claim 1, further includes a template repository configured to store images, fonts, campaign templates and configured to be accessible by said entity for designing campaign.

13. A network of systems for generating and sending personalized campaign messages from a plurality of entities to a plurality of clients, wherein each of said client is a client of at least one of said entities and each system in said network is associated with one entity in a one to one correspondence, wherein each of said client has a client device in which is configured an application associated with at least one entity (n) of said plurality of entities, to which said client belongs, a system, associated with said entity in said network implemented in at least one computer comprising at least one processor configured to control the following:
i. a system setup module configured to initiate set up of the modules and repositories in said system, said system setup module having a first rules repository containing pre-set and pre-fed rules;
ii. a client information server configured to receive client data from said entity and further configured to manage said client data, said client information server further comprising:
a data receiving module configured to receive incoming raw client data from a client data sending module resident in said entity;
a data monitoring module configured to cooperate with said data receiving module to receive said raw client data and monitor its complete receive;
a data converter module configured to receive said monitored raw client data, and further configured to convert said monitored raw client data into validated and formatted data, based on said pre-set targeting rules from said first rules repository;

a first data repository, being a non-transitory computer medium, configured to store said validated and formatted data;
a data loading module configured to receive said validated and formatted data from said data converter module and further configured to push said validated and formatted data into said first data repository;
iii. a targeting module configured to filter and extract validated and formatted data present in first data repository for said entity:
a rules processor comprising a third repository configured to store and save a plurality of pre-set targeting rules for linking of campaigns to clients and further including a crawler and extractor pair configured to crawl upon said first data repository and extract client ids based on said targeting rules from said first data repository corresponding to said campaigns based on the pre-set targeting rules;
a list processor configured to receive a list of the extracted client ids and further extract validated and formatted client data, of clients with whom selected campaigns are to be shared; and
a predictive machine learning model processor configured to shortlist clients based on a predictive model;
iv. a production server configured to receive said validated and formatted client data after filtration by said targeting module, said production server comprising:
a campaigns receiving module configured to receive a plurality of campaigns wherein each campaign consisting of at least one message from a campaigns sending module resident in said entity;
a multifaceted prism building block configured to:
receive a signal, from the client device of a client who is a client of said entity when said client has logged on to an application pre-fed by said entity and pre-stored on said client device;
fetch the validated and formatted data of client from said first data repository;
select at least one campaign from said campaigns receiving module after reading and determining campaign relevant to said client;
create a stack of messages of said selected campaigns;
personalize each message in said stack using the fetched validated and formatted data of said client to create personalized stacks of messages;
a create at least one 3d story using said personalized stack of messages;
v. a story delivery module configured to receive said created at least one 3d story and further configured to deliver said 3d story to said client device.

14. The system as claimed in claim 13, wherein said multifaceted prism building block comprises:
a production module configured to cooperate with said targeting module to select at least one unique campaign relevant to said client from said campaigns receiving module and further configured to create and save at least one unique message stack for said client based on said unique campaign provided the client satisfies at least one of the targeting rules pre-set in at least one of the processors in the targeting module;
a personalization module configured to personalize each message in said message stack upon requirement based on said validated and formatted client data and create a personalized message stack; and
a multifaceted prism assembly module configured to create at least one multifaceted 3d personalized story using said personalized unique message stack.

15. The system as claimed in claim 14, wherein said production module includes:
a campaign fetching module configured to fetch at least one campaign from said campaigns receiving module;
a message extractor module configured to extract a pilot message and a campaign message from said received campaign, said pilot message being a message selected from a group of pilot messages consisting of:
an urgent message that overrides all the campaigns and make that campaign mandatory for all clients;
a non-discrete message that is mandatory for all clients along with other optional campaigns; and
a filter message that would subject said received campaign to filtration using at least one of the processors or the processors in combination of the targeting module;
a decision module configured to compare said campaign message to client validated and formatted data based on said pilot message to find out a relevant message for said client and further configured to iterate this process for each campaign in said campaigns receiving module; and
a stack creation module configured to receive said relevant message and further configured to create a unique message stack to save at least one relevant message for said client in a production repository.

16. The system as claimed in claim 14, wherein said personalization module inserts said client's first name dynamically at least at one appropriate place in a message dynamically, in order to personalize said at least one message in said message stack if the message is required to be personalized.

17. The system as claimed in claim 14, wherein said multifaceted prism assembly module includes:
an ad building module configured to create a prism, and further configured to determine the number of faces of said prism and width and height of said messages to be inserted on the said faces and is further configured to transform said prism to a multifaceted prism having a plurality of lateral face and two end faces;
a loading module configured to load at least one preconfigured image on said end faces of said multifaceted prism; and
a populating module configured to pull a message from said personalized unique message stack from said personalization module and further configured to dynamically load said message on to a lateral face of said multifaceted prism and create a 3d story and iterate this dynamic message loading process upon sensing client's swipe gesture while hovering over said 3d story onto the fixed number of lateral faces of the multifaceted prism.

18. The system as claimed in claim 17, wherein said populating module further configured to track lateral movement of said client while viewing a message in said 3d story and further configured to fill lateral faces dynamically using at least one message from said personalized unique message stack.

19. The system as claimed in claim 13, wherein said multifaceted prism assembly module further includes a redirection module configured to identify a gesture of said client when the client hovers over the 3d story and is further configured to redirect the client to a pre-set URL or to a preconfigured image based on the gesture.

20. The system as claimed in claim 13, wherein said predictive machine learning model processor includes:
- a model creation module configured to cooperate with said second repository to create a predictive model for each of said campaigns and further configured to determine a propensity of said client; and
- a model execution and targeting module configured to cooperate with said first data repository to fetch said client data to calculate a relevance weight for each of said campaigns and further configured to select a plurality of campaigns for said client using said relevance weight.

21. The system as claimed in claim 13, wherein said rules processor configured to create said targeting rules based on multiple combinations of operators from 'AND', 'OR', 'NOT', 'greater than', 'equal to', 'not equal to', 'less than', 'not less than' and the like.

22. The system as claimed in claim 13, wherein said rules processor uses said targeting rules to extract said client id from said first data repository that qualifies for one of said rule.

23. The system as claimed in 13, further comprises a statistics managing module configured to receive clicks and impressions from said client device related to said 3d story and further configured to save said received clicks and impressions in a second repository.

24. The system as claimed in claim 23, wherein said statistics managing module includes:
- said story delivery module further configured to receive clicks and impressions of said client from said client device related to said 3d story;
- a second repository configured to store said impressions and clicks data along with corresponding said client data and said campaign details; and
- a stats delivery module configured to cooperate with said story delivery module to receive said clicks and impressions and further configured to push said impressions and clicks data to said second repository.

25. The system as claimed in claim 13, further includes a performance statistics module configured to save a plurality of impressions and clicks of said client and further configured to send a plurality of performance reports of a campaign to said entity.

26. The system as claimed in claim 25, wherein said performance statistics module includes:
- said second repository configured to cooperate with said stats delivery module to receives said impressions and clicks data of said client (x) and further configured to store said impressions and clicks data; and
- a statistics generation module configured to send a performance report of said campaign to said entity.

27. The system as claimed in claim 26, wherein said statistics generation module configured to send at least one report that includes:
- an influenced conversion report configured to chart a plurality of new accounts opened by new said clients that have been influenced by a view and/or click of said campaign;
- a campaign category analytics report configured to share said campaign performance across all said campaigns or within a selected category of said campaign;
- a monthly management report configured to encapsulate said client engagement performance results directly related to said campaigns published within past five calendar months;
- a key engagement indicator configured to display an average number of said client logged on to produce at least one click and further alerts if said average number is greater than a pre-determined threshold;
- a category report configured to display all said campaign in each said category via a donut chart; and
- a views report configured to displays most viewed said campaigns in last 7 days.

28. The system as claimed in claim 26, wherein said statistics generation module is further configured to send a performance metrics to provide an overall view of a status of said data and said campaigns, said performance metrics include:
- data freshness configured to display number of days since the last said data was upload; and
- campaign freshness configured to display an average age of said campaign.

29. The system as claimed in claim 26, wherein said statistics generation module is further configured to send an ad stats today in real-time, that includes:
- total number of impressions today as well as the highest number of impressions seen in the last 30 days;
- today clicks-shows number of clicks today; and
- campaign alert-shows a campaign more than 90 days old or is trending down.

30. The system as claimed in claim 26, wherein said statistics generation module generate said reports where data can be seen on an entity device in an application or can be exported to one of .csv, .xls and .png file.

31. The system as claimed in claim 26, wherein said statistics generation module said campaign performance information can be displayed in one of bar graph, donut chart, historical view and tabular view.

32. The system as claimed in claim 13, wherein said campaign receiving module configured to cooperate with said campaigns sending module to receive said campaign designed by said entity (n).

33. A method for generating and sending personalized campaign messages from a plurality of entities to a plurality of clients, wherein each of said client is a client of at least one of said entities wherein each of said client has a client device in which is configured an application associated with at least one entity of said plurality of entities, to which said client belongs, said method comprising steps of:
- storing, using a system setup module, a first rules repository containing pre-set and pre-fed rules;
- configuring, using said system setup module, the modules in said system by a first rules repository containing pre-set and pre-fed rules;
- receiving, using a client information server, client data received from said entity;
- managing, using said client information server, said client data;
- receiving, using a data receiving module, an incoming raw client data from a client data sending module resident in said entity;
- receiving, using a data monitoring module, said raw client data from said data receiving module;
- monitoring, using said data monitoring module, complete receive of said raw client data;
- receiving, using a data converter module, said monitored raw client data;
- converting, using said data converter module, said monitored raw client data into validated and formatted data, based on said pre-set and pre-fed rules from said first rules repository;
- storing, using a first data repository, said validated and formatted data;

receiving, using a data loading module, said validated and formatted data from said data converter module;

pushing, using said data loading module, said validated and formatted data into said first data repository;

receiving, using a production server, said validated and formatted client data per se or said validated and formatted client data with or without filtration;

receiving, using a campaigns receiving module, a plurality of campaigns wherein each campaign consisting of at least one message from a campaigns sending module resident in said entity;

receiving, using a multifaceted prism building block, a signal from the client device of a client who is a client of said entity when said client has logged on to an application pre-fed by said entity and pre-set on said client device;

fetching, using said multifaceted prism building block, said validated and formatted data of client from said first data repository;

selecting, using said multifaceted prism building block, at least one campaign from said campaigns receiving module after reading and determining campaign relevant to said client;

creating, using said multifaceted prism building block, a stack of messages of said selected campaigns;

personalizing, using said multifaceted prism building block, message in said stack if required, using the fetched validated and formatted data of said client to create personalized stacks of messages;

creating, using said multifaceted prism building block, at least one 3d story using said personalized stack of messages;

receiving, using a story delivery module, said created 3d story; and delivering, using said story delivery module, said 3d story to said client device.

34. The method as claimed in claim 33 wherein the method includes delivering said 3d story to said client device in realtime.

35. The method as claimed in claim 33, further comprises steps of:

receiving, using a statistics managing module, clicks and impressions from said client device related to said 3d story; and saving, using said statistics managing module, said received clicks and impressions in a second repository.

36. The method as claimed in claim 35, wherein said fetching, using said production module, further includes:

fetching, using a campaign fetching module at least one campaign from said campaigns receiving module;

extracting, using a message extractor module, a pilot message and a campaign message from said received campaign, wherein said pilot message being a message selected from a group of pilot messages consisting of:

an urgent message that overrides all the campaigns and makes said received campaign mandatory for all clients;

a non-discrete message that makes said received campaign mandatory for all clients along with other optional campaigns; and a filter message that would subject said received campaign to filtration;

comparing, using a decision module, said campaign message with client validated and formatted data based on said pilot message to find out a relevant message for said client;

iterating, using said decision module, these steps of extracting and comparing for each campaign in said campaigns receiving module;

receiving, using a stack creation module, said relevant message; and creating, using said stack creation module, a unique message stack to save at least one relevant message for said client in a production repository.

37. The method as claimed in claim 35, wherein said step creating using said multifaceted prism assembly module includes:

creating, using an ad building module, a prism;

determining, using said ad building module, the number of faces of said prism and width and height of said messages to be inserted;

transforming, using said ad building module, said prism into a multifaceted prism having a plurality of lateral face and two end faces;

loading, using a loading module, at least one preconfigured image on said end faces of said prism;

pulling, using a populating module, a first message from said personalized unique message stack from said personalization module;

dynamically loading, using said populating module, said message on to a lateral face of said prism; and iterating, using said populating module, said step of pulling and said step of dynamically loading until all messages in said personalized message stack are loaded onto the lateral faces of the prism to make a 3d story.

38. The method as claimed in claim 37, wherein said step of receiving, using said production module, includes:

fetching, using a campaign fetching module at least one campaign from said campaigns receiving module;

extracting, using a message extractor module, a pilot message and a campaign message from said received campaign, wherein said pilot message being a message selected from a group of pilot messages consisting of:

a an urgent message that overrides all the campaigns and make that campaign mandatory for all clients;

a a non-discrete message that is mandatory for all clients along with other optional campaigns; and a filter message that would subject said received campaign to filtration using at least one of the processors or the processors in combination in the targeting module, comparing, using a decision module, said campaign message with client validated and formatted data based on said pilot message to find out a relevant message for said client;

iterating, using said decision module, these steps of extracting and comparing (368) for each campaign in said campaigns receiving module;

receiving, using a stack creation module, said relevant message; and creating, using said stack creation module, a unique message stack to save at least one relevant message for said client in a production repository.

39. The method as claimed in claim 38, further comprises steps of:

receiving, using a statistics managing module, clicks and impressions from said client device related to said 3d story; and saving, using said statistics managing module, said received clicks and impressions in a second repository.

40. The method as claimed in claim 37, wherein said step of shortlisting using said predictive machine learning model processor includes:

creating, using a model creation module, a predictive model for each of said campaigns;

determining, using said model creation module, a propensity of said client (x);

fetching, using a model execution and targeting module, fetch said client data from said first data repository;

calculating, using said model execution and targeting module, a relevance weight for each of said campaigns; and selecting, using said model execution and targeting module, a plurality of campaigns for said client using said relevance weight.

41. The method as claimed in claim 33, wherein said step of receiving using said multifaceted prism building block further includes:

fetching, using a production module, validated and formatted data of client;

selecting, using said production module, at least one unique campaign from said campaigns receiving module relevant to said client in a production repository;

creating, using said production module, unique message stack for said client using said unique campaign;

saving, using said production module, said unique message stack;

personalizing, using a personalization module, message in said unique message stack if required based on said validated and formatted client data;

creating, using a personalization module, a personalized message stack; and creating, using a multifaceted prism assembly module, at least one multifaceted 3d personalized story using said personalized unique message stack.

42. The method as claimed in claim 33, which includes the steps of:

extracting, using a targeting module, validated and formatted data present in first data repository for said entity;

storing, using a rules processor, a plurality of pre-set targeting rules for linking of campaigns to clients using a repository;

crawling and extracting, using a rules processor, client ids from said first data repository based on said rules from said first data repository corresponding to said campaigns based on the pre-set targeting rules;

receiving, using a list processor, a list of the extracted client ids and further extract validated and formatted client data, of clients with whom selected campaigns are to be shared;

shortlisting, using a predictive machine learning model processor, said clients based on a predictive model; and receiving, using a production server, said validated and formatted client data after filtration.

\* \* \* \* \*